United States Patent [19]
MacLeay et al.

[11] Patent Number: 5,162,405
[45] Date of Patent: Nov. 10, 1992

[54] SINGLE-FUNCTIONAL AND MIXTURES OF MULTI-FUNCTIONAL OLIGOMERIC PERFORMANCE ADDITIVE COMPOSITIONS AND THEIR USES

[75] Inventors: Ronald E. MacLeay, Williamsville; Jose Sanchez, Grand Island; Daryl L. Stein, Clarence, all of N.Y.

[73] Assignee: ELF Atochem North America, Inc., Philadelphia, Pa.

[21] Appl. No.: 675,357

[22] Filed: Mar. 22, 1991

Related U.S. Application Data

[62] Division of Ser. No. 137,989, Dec. 24, 1987, Pat. No. 5,013,777.

[51] Int. Cl.$^5$ .............. C08K 5/36; C08K 5/3495; C08K 5/3435; C08K 5/20; C08K 5/12; C08K 5/11; C08K 5/5399; C08K 5/526; C07C 323/18; C07C 271/45; C07C 271/22; C07C 235/72; C07C 69/66; C07F 9/145; C07D 211/92; C07D 211/48

[52] U.S. Cl. .................. 524/91; 524/102; 524/121; 524/128; 524/199; 524/208; 524/209; 524/219; 524/220; 524/222; 524/225; 524/281; 524/289; 524/291; 546/190; 548/260; 548/261; 558/156; 558/157; 558/165; 558/266; 558/267; 558/402; 560/9; 560/15; 560/25; 560/60; 560/67; 560/152; 564/154; 564/158

[58] Field of Search .......... 524/222, 289, 291, 220, 524/219, 225, 303, 128, 121, 199, 281, 208, 209, 91, 102; 560/60, 67, 15, 9, 25, 61, 152; 564/158, 154; 548/260, 261; 546/190; 558/156, 157, 165, 266, 267, 402

[56] References Cited

U.S. PATENT DOCUMENTS

| | | | |
|---|---|---|---|
| 2,574,516 | 11/1951 | Walter et al. | 260/461 |
| 2,944,075 | 7/1960 | Debo | 260/461 |
| 3,057,724 | 10/1962 | Lovett et al. | 564/154 |
| 3,112,268 | 11/1963 | Calhoun | 560/154 |
| 3,215,725 | 11/1965 | Strobel et al. | 558/402 |
| 3,313,866 | 4/1967 | Horton et al. | 524/291 |
| 3,314,888 | 4/1967 | Matson | 560/152 |
| 3,359,348 | 12/1967 | Friedman | 558/156 |
| 3,365,421 | 1/1968 | Horton et al. | 260/45.7 |
| 3,391,110 | 7/1968 | Coleman | 260/47 |
| 3,402,221 | 9/1968 | Caldwell | 260/897 |
| 3,629,191 | 12/1971 | Heller et al. | 548/261 |
| 3,665,031 | 5/1972 | Peterli et al. | 260/45.95 |
| 3,676,471 | 7/1972 | Eggensperger et al. | 260/410 |
| 3,708,520 | 1/1973 | Dexter et al. | 260/473 |
| 3,819,573 | 6/1974 | Ackermann et al. | 260/45.9 |
| 3,846,469 | 11/1974 | Gunsher et al. | 260/463 |
| 3,849,373 | 11/1974 | Siegle et al. | 260/47 |
| 3,850,878 | 11/1974 | Murtha et al. | 260/45.9 R |
| 3,915,930 | 10/1975 | Dotson et al. | 260/45.8 N |
| 3,922,250 | 11/1975 | Cleary | 260/49 |
| 3,933,734 | 1/1976 | Mark et al. | 260/45.7 |
| 3,940,366 | 2/1976 | Mark | 260/45.9 |
| 3,943,106 | 3/1976 | Schmidt et al. | 260/47 |
| 3,944,594 | 3/1976 | Kleiner et al. | 260/473 |
| 3,948,851 | 4/1976 | Mark | 260/45.9 |
| 3,951,910 | 4/1976 | Mark | 260/45.9 |
| 3,951,915 | 4/1976 | Keck et al. | 260/47 |
| 3,956,269 | 5/1976 | Sheppard et al. | 548/261 |
| 3,957,920 | 5/1976 | Kleiner et al. | 260/897 |
| 3,974,083 | 8/1976 | Suen et al. | 260/485 |
| 3,978,024 | 8/1976 | Mark | 260/45.7 |
| 3,984,460 | 10/1976 | Spivack | 260/873 |
| 4,032,506 | 6/1977 | Mark | 260/45.8 |
| 4,032,562 | 6/1977 | Dexter et al. | 260/473 |
| 4,033,930 | 7/1977 | Mark | 260/45.9 |
| 4,064,101 | 12/1977 | Mark | 260/45.85 |
| 4,073,768 | 2/1978 | Mark | 260/45.7 |
| 4,092,294 | 5/1978 | Bennett et al. | 260/47 |
| 4,094,857 | 6/1978 | Wolfe, Jr. | 260/45.9 |
| 4,115,476 | 9/1978 | Managawa et al. | 524/102 |
| 4,125,515 | 11/1978 | Kuczkowski | 560/152 |
| 4,175,970 | 11/1979 | LeStrange | 430/529 |
| 4,178,398 | 12/1979 | Nachbur et al. | 427/379 |
| 4,202,834 | 5/1980 | Gruber et al. | 260/465 |
| 4,207,253 | 6/1980 | Lorenz et al. | 260/465 |
| 4,210,612 | 7/1980 | Karrer | 525/204 |
| 4,247,475 | 1/1981 | Ching | 260/465 |
| 4,260,719 | 4/1981 | Ching | 528/196 |
| 4,264,680 | 4/1981 | Anthony | 428/412 |

(List continued on next page.)

FOREIGN PATENT DOCUMENTS

| | | |
|---|---|---|
| 490022 | 3/1977 | Australia . |
| 995686 | 8/1976 | Canada . |
| 1016295 | 8/1977 | Canada . |
| 1180496 | 1/1985 | Canada . |
| 0140144 | 5/1985 | European Pat. Off. . |
| 2174093 | 10/1986 | United Kingdom . |

Primary Examiner—Veronica P. Hoke
Attorney, Agent, or Firm—Panitch, Schwarze, Jacobs & Nadel

[57] ABSTRACT

The present invention comprises novel single-functional and mixtures of multi-functional oligomeric performance additive compounds having one or more components of Structure A

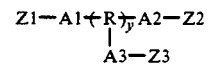

(The definitions of R, Z1, Z2, Z3, A1, A2, A3 and y are given in the Summary Section), their uses and polymeric compounds and compositions containing them which have enhanced oxidative stabilities, enhanced ultraviolet (UV) and light stabilites and/or enhanced flame retardance. An example is the bis sulfonic acid bispotassium salt reaction product from an oligomeric caprolactone diol (TONE ® 260), 2-sulfobenzoic acid anhydride and potassium carbonate, and use of this product, at levels up to about 3.0%, in a general purpose bisphenol A polycarbonate resin, to enhance the fire resistance or flame retardance of the polycarbonate resin.

8 Claims, No Drawings

U.S. PATENT DOCUMENTS

| | | | |
|---|---|---|---|
| 4,276,136 | 6/1981 | Gruber et al. | 204/159 |
| 4,279,805 | 7/1981 | Ohzeki et al. | 564/154 |
| 4,285,855 | 8/1981 | Tokuda | 525/470 |
| 4,294,949 | 10/1981 | Karrer | 526/262 |
| 4,304,895 | 12/1981 | Loshaek | 526/313 |
| 4,316,838 | 2/1982 | Tokuda | 525/470 |
| 4,362,831 | 12/1982 | Ohzeki et al. | 524/102 |
| 4,397,977 | 8/1983 | Sandler | 524/288 |
| 4,418,000 | 11/1983 | Zannucci et al. | 252/403 |
| 4,501,854 | 2/1985 | Singer et al. | 525/162 |
| 4,533,690 | 8/1985 | Rosenquist | 524/161 |
| 4,556,714 | 12/1985 | Karrer | 546/190 |
| 4,594,444 | 6/1986 | Orban | 560/67 |
| 4,686,061 | 8/1987 | Nollet et al. | 558/271 |
| 4,730,017 | 3/1988 | Avar | 524/103 |
| 4,743,637 | 5/1988 | Axelrod et al. | 524/94 |
| 4,762,870 | 8/1988 | Lai et al. | 546/190 |
| 4,847,380 | 7/1989 | Speranza et al. | 546/190 |
| 4,904,795 | 2/1990 | Bohen et al. | 548/406 |
| 5,030,731 | 7/1991 | Slongo et al. | 548/260 |

5,162,405

SINGLE-FUNCTIONAL AND MIXTURES OF MULTI-FUNCTIONAL OLIGOMERIC PERFORMANCE ADDITIVE COMPOSITIONS AND THEIR USES

CROSS REFERENCE TO RELATED APPLICATION

This is a division of co-pending U.S. patent application Ser. No. 137,989, filed Dec. 24, 1987, now U.S. Pat. No. 5,013,777 issued May 7, 1991.

BACKGROUND OF THE INVENTION

1. Field of the Invention

This invention relates to novel single-functional and mixtures of multi-functional oligomeric performance additive compounds, their uses and polymeric compounds and compositions containing them which have enhanced oxidative stabilities, enhanced ultraviolet (UV) and light stabilities ad/or enhanced flame retardance properties.

As a result of research relating to the above-identified oligomeric performance additive compounds, the inventors have discovered that certain sulfobenzoic acids, esters and their salts have a previously undiscovered use as flame retardant additives to oligomers and polymers, and particularly as additives to aromatic polycarbonates.

2. Definitions

To aid in understanding the present invention, the following definitions of terms used in the description and/or claims are set forth:

"Single-Functional Oligomeric Performance Additive"—An oligomeric compound or composition having a single (one) type of performance additive function (e.g., UV stabilizer, light stabilizer, flame retardant or antioxidant stabilizer).

"Multi-functional Oligomeric Performance Additive"—An oligomeric compound or composition having more than one type of performance additive function.

"Non-fugitive"—An additive is non-fugitive if it does not leach out of a thermoplastic polymeric resin to which it is added, either during processing or during the end use of the thermoplastic resin to which the additive has been added.

"Oligomer"—A compound or composition having two or more repeat units in its chemical structure, but usually does not include high polymers having molecular weights above about 10,000.

3. Description of the Prior Art

Although thermoplastics (hereinafter generally referred to as "plastics") have many desirable properties and, consequently, a myriad of uses, they also suffer from deficiencies that can limit or even prevent their use in certain applications. Some of the more common deficiencies of plastics are that, 1) most can burn, 2) they are subject to oxidative degradation during processing and end use, and, 3) they are subject to degradation by light, and particularly by ultraviolet (UV) light. Therefore, in order to overcome these deficiencies, a wide variety of fire retardants, antioxidants and UV and light stabilizer additives have been developed. In order to be successful, an additive must be compatible with the plastic, i.e., it must not significantly adversely affect physical properties that are important to the end user, and it must be non-fugitive. An important consideration is that approval by the U.S. Food and Drug Administration of a plastic composition used in food and related applications is easier to obtain when it contains a non-fugitive additive.

One general approach to compatible, non-fugitive additives is to copolymerize them with the monomer(s) that constitute the plastic. This can be accomplished in several ways. For example, a vinyl group can be attached to the performance additive, which in principle, can then be copolymerized with other vinyl monomers to form a copolymer with pendant performance additives covalently attached. Alternately, performance additives possessing suitable functional groups, such as hydroxy, amino or carboxy groups, can take part in condensation polymerizations to form polymers, such as polyesters, polyamides, and polyurethanes, with attached performance additive groups.

One type of fire retardant additive for plastics is the halogenated aromatic class of fire retardants. Thus, an example of a copolymerization of a fire retardant with a vinyl group attached is the copolymerization of bromostyrene with a vinyl monomer, such as styrene. An example of condensation polymerization of a fire retardant with a suitable monomer is the copolymerization of tetrabromobisphenol A and bisphenol A with phosgene in the presence of base to form a co-polycarbonate.

One type of antioxidant additive is the hindered phenol class of antioxidants. Vinyl ester derivatives of 3-(3,5-di-t-butyl-4-hydroxypehnyl) propionic acid (HBPA) have been copolymerized to form polyolefins with antioxidant bound to the polymer. Examples of this approach are disclosed in U.S. Pat. Nos. 3,708,520 and 3,957,920. Diester derivatives of HBPA have also been used in condensation polymerizations to form polyesters with the additive attached. Examples here are in U.S. Pat. Nos. 3,943,106; 3,951,915 and 4,094,857.

There are many types of UV stabilizers for plastics, examples being o-hydroxybenzophenones, cyanocinnamates, hindered amine light stabilizers (HALS), 2-hydroxyphenylbenzotriazoles, dialkyl benzylidenemalonates, and oxanilides. Vinyl ester derivatives of 2,4-dihydroxybenzophenones (DHBP) have been both homopolymerized and copolymerized. This work is described in U.S. Pat. Nos. 3,313,866; 3,365,421; 3,391,110; and 4,304,895. In addition, suitably substituted DHBP derivatives such as 2-hydroxy-4-(2-hydroxyethoxy) benzophenone, have been used in condensation polymerizations as described in U.S. Pat. Nos. 4,418,000 and 4,264,680.

In the case of the cyanocinnamate class of stabilizers, various vinyl ester derivatives of 2-cyano-3,3-diphenyl-2-propenoic acid have been copolymerized with different vinyl monomers as described in U.S. Pat. Nos. 4,276,136; 4,207,253 and 4,202,834. vinyl monomers of HALS are also known and have been copolymerized with a variety of monomers. Examples can be found in U.S. Pat. Nos. 4,175,970; 4,210,612 and 4,294,949. there are also examples of HALS compounds used in condensation polymerizations as disclosed in Canadian Patent 1,016,295. In these examples, a HALS is attached to an ethylene oxide oligomer, which in turn is copolymerized with diethylene glycol terephthalate to form a polyethylene terephthalate polyester with a HALS group incorporated into it.

Although the above approaches do incorporate a non-fugitive additive into a plastic, there are still some drawbacks. For instance, additives with a vinyl or other suitable functional group may not be readily available, the reactive additive may not copolymerize easily with the desired monomers, or the resultant copolymer may be deficient in other physical properties (such as impact strength) that are important to the end user.

Instead of the foregoing approaches for incorporating non-fugitive additives in plastics, in accordance with the inventive concept of the present invention, a performance additive is attached onto an oligomer having a molecular weight of less than about 10,000, typically, less than about 5,000, and then the oligomer-additive adduct is blended with the desired polymer. By judicious choice of oligomers, the compatibility of the oligomer-additive adduct with a polymer can be assured, and with relatively high molecular weight of the adduct, its non-fugitive nature in a polymer blend is also assured.

In order to use this approach, suitable reactive functional groups at one end, at both ends and/or on branch points along the oligomer are required. Thus, mono-, di- or polyadducts can be prepared and blended with the chosen polymer. Examples of suitable functional groups on an oligomer are groups such as acid halide, amino, anhydride, carboxy, chloroformate, epoxy, hydroxy, and isocyanate.

These same types of functional groups may also be present on the additive. Thus, chemical attachment of the additive onto the oligomer is assured by incorporating functional groups onto the additive that are known in the art to react with those on the oligomer. One example is an additive with acid halide (chloride for instance) groups being reacted with an oligomer possessing hydroxy groups to form an oligomer-additive adduct held together by the resultant ester linkages.

Polymers including fire retardant functional groups are known in the prior art. One particular type has aromatic sulfonic acid salts as the retardant functional group. These are effective fire retardants for aromatic polycarbonates (PC's). Examples of polymeric salts are polysulfonated salts of polysulfone and polysulfone copolymers which are described in U.S. Pat. Nos. 4,033,930; 4,092,294 and 3,948,851. In U.S. Pat. No. 3,978,024, sulfonated salts or aromatic polycarbonates are disclosed, while in U.S. Pat. No. 4,032,506 polysodium poly(2,6-di-methyl-phenylene oxide) polysulfonate is mentioned. Sulfonated salts of polymers with aralkenylidene moieties are disclosed in U.S. Pat. Nos. 3,940,366 and 3,933,734. In U.S. Pat. No. 3,951,910, sulfonic acid salts of a variety of polymers are described. The above examples all share the common thread of a polymer being sulfonated with a suitable sulfonating agent such as sulfur trioxide or fuming sulfuric acid. However, there are only a few examples of a sulfonic acid salt being incorporated into a polymer using other types of reagents.

The prior art does not disclose the use of 2-sulfobenzoic acid compounds, such as 2-sulfobenzoic acid cyclic anhydride and related compounds of the present invention as reagents for polymers or oligomers containing mono-, di-, and polyhydroxy functional groups. When this additive and a hydroxy or amino oligomer are allowed to react in the presence of base, the resulting compounds are polymers or oligomers which have one or more arylsulfonic acid salt groups attached to them. Such compounds are fire retardant additives according to the present invention useful for aromatic polycarbonates (PC's).

Thus, in the case of sulfonic acid salt fire retardants, it is believed that the closest prior art to the present invention is disclosed in U.S. Pat. Nos. 3,933,734 and 4,285,855 where propane sulfone is used as an endcapping agent for polymers. The products are polymers endcapped with alkylsulfonic acid groups. These are fire retardant additives for aromatic (PC's).

In the case of UV stabilizers, the closest prior art to the present invention is believed to be disclosed is U.S. Pat. Nos. 4,260,719 and 4,247,474 where cyanocinnamate types of UV stabilizer, 1-cyano-3,3-diphenyl-2-propenoyl chloride and 2-(chlorocarbonyloxy)ethyl-2-cyano-3,3-diphenylacrylate are used to endcap polycarbonate.

In the case of antioxidants, the closest prior art to the present invention is believed to be disclosed in U.S. Pat. Nos. 3,944,594 and 4,032,562, and Canadian Patent 995686 where polyethylene oxide esters of HBPA are disclosed as antioxidants for plastics. In U.S. Pat. No. 3,819,573 HBPA was attached to aliphatic polyesters or polyamides by heating either it or its methyl or ethyl ester derivatives in the presence of suitable monomers or oligomers, such as caprolactone and caprolactam and oligomers therefrom.

The prior art does not disclose the endcapping of aliphatic polyester, polycarbonate, polyamide, polyurethane and polyurea oligomers. In addition, polyether-polythioether co-oligomers, amino terminated plyethers and hydroxy- or amino-terminated silicones or silicone copolymers have not been disclosed, nor have been disclosed hydroxy terminated polyethylene oligomers, amino- or hydroxy-terminated polybutadiene oligomers, amino- or hydroxy-terminated polybutadiene-acrylonitrile oligomers, or styrene-allyl alcohol co-oligomers. In this invention, the above oligomers can be endcapped with suitable fire retardants, antioxidants, light and/or UV stabilizers, and the resultant oligomer-additive adduct can be blended into a compatible polymer so as to improve the fire retardance and/or oxidative stability and/or light and/or UV stability of the polymer.

SUMMARY OF THE INVENTION

The present invention comprises in one aspect novel single-functional and mixtures of multi-functional oligomeric performance additive compounds having one or more components of Structure A:

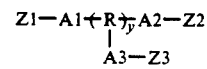

where
y=0 to 75,
Z1, Z2 ad Z3 are the same or different with the proviso that at least one of Z1, Z2 and Z3 is selected from the group consisting of at least one of performance additive functional group I, II, III and IV, wherein
performance additive functional group I is an antioxidant monoradical having a structure selected from the group consisting of structure (1), (2) and (3):

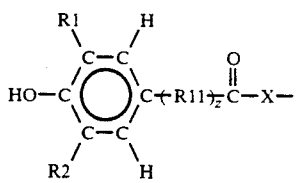

where

X is selected from the group consisting of NH and O,

R1 and R2 are the same or different and each is an alkyl radical of 1 to 13 carbons, preferably a t-alkyl radical of 4 to 8 carbons or a t-aralkyl radical of 9 to 13 carbons, R11 is selected from the group consisting of nothing and an alkylene diradical of 1 to 6 carbons, preferably 1 to 3 carbons, Z is 0 or 1; and

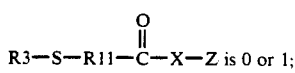

where R3 is selected from the group consisting of an alkyl radical of 1 to 18 carbons, an aryl radical of 6 to 12 carbons and an aralkyl radical of 7 to 11 carbons; and

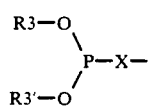

where

R3 and R3' are the same or different, and

R3' is selected from the group consisting of an alkyl radical of 1 to 18 carbons, an aryl radical of 6 to 12 carbons and an aralkyl radical of 7 to 11 carbons;

performance additive functional group (II) is a UV stabilizing monoradical having a structure selected from the group consisting of structure (1), (2), (3) and (4):

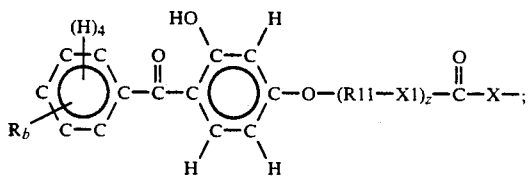

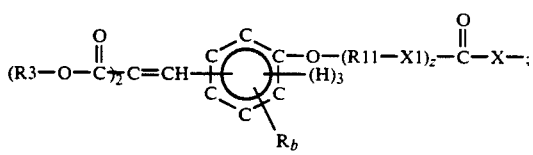

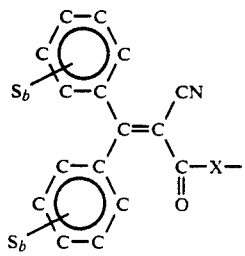

where

X1 is selected from the group consisting of nothing and O, and

R$_b$ is selected from the group consisting of hydrogen and a substituent selected from the group consisting of a lower alkyl radical, a lower alkoxy radical, a cyano radical, chloro, bromo and nitro;

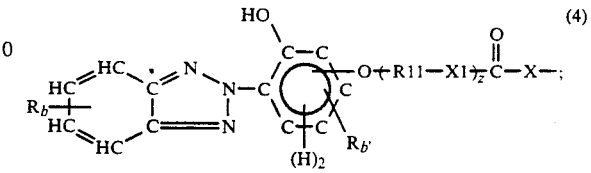

where

R$_b$' is selected from the group consisting of hydrogen and a substituent selected from the group consisting of a lower alkyl radical, a t-octyl radical, an α-cumyl radical, a lower alkoxy radical, a cyano radical, chloro, bromo and nitro;

performance additive functional group (III) is a light stabilizing monoradical having a structure:

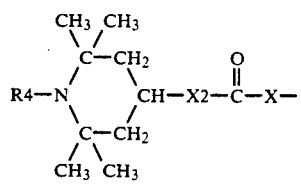

where

X and X2 are the same or different and each is selected from the group consisting of HN and O, and R4 is selected from the group consisting of H, a lower alkyl radical, an acyl of 2 to 18 carbons, an aroyl radical of 7 to 15 carbons, an alkoxycarbonyl radical of 2 to 19 carbons, and an aryloxy-carbonyl radical of 7 to 15 carbons; and performance additive functional group (IV) is a flame retardant monoradical having a structure selected from the group consisting of structure (1), (2), (3), (4), (5) and (6):

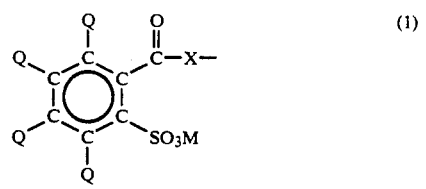

where

Q is selected from the group consisting of H, Cl and Br and

M is selected from the group consisting of H, an alkali metal and an alkaline earth metal;

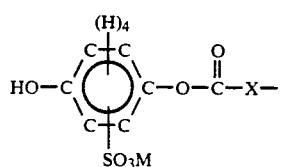

-continued

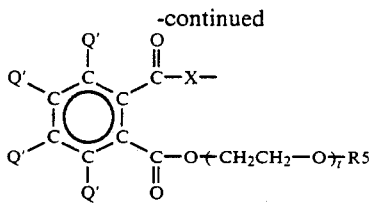
(3)

where
R5 is an alkyl radical of 1 to 12 carbons,
Q' is selected from the group consisting of Cl and Br, and
t is 0 to 15;

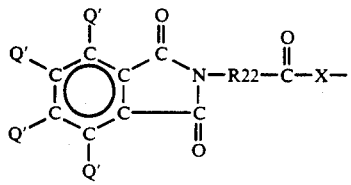
(4)

where R22 is selected from a group consisting of an alkylene diradical of 1 to 4 carbons, a 1,3-phenylene diradical and a 1,4-phenylene diradical;

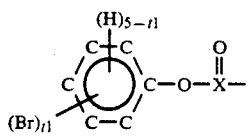
(5)

where t1 is 1 to 5; and

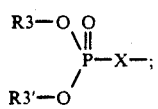
(6)

Any other of Z1, Z2 and Z3 not selected from the group consisting of performance additive functional groups I, II, III and IV is selected from the group consisting of hydroxy amino, at least one substituted radical and an unsubstituted radical, where the radical is selected from the group consisting of an alkoxy radical of 1 to 12 carbons, an alkylamino radical of 1 to 12 carbons, an acyloxy radical of 1 to 12 carbons, an acylamino radical of 1 to 12 carbons, an alkenoyloxy radical of 3 to 12 carbons, an alkenoylamino radical of 3 to 12 carbons, an aroyloxy radical of 7 to 15 carbons, an aroylamino radical of 7 to 15 carbons, a phthalimido radical, an alkoxycarbonyloxy radical of 2 to 13 carbons, an alkoxycarbonylamino radical of 2 to 13 carbons, an alkenyloxycarbonyloxy radical of 3 to 12 carbons, an alkenyloxycarbonylamino radical of 3 to 12 carbons, an aryloxycarbonyloxy radical of 7 to b 15 carbons, an aryloxycarbonylamino radical of 7 to 15 carbons, an alkylaminocarbonyloxy radical of 2 to 13 carbons, an arylaminocarbonyloxy radical of 7 to 15 carbons, an aralkylaminocarbonyloxy radical of 7 to 16 carbons, an alkylsulfonyloxy radical of 1 to 8 carbons, an alkylsulfonylamino radical of 1 to 8 carbons, an arylsulfonyloxy radical of 6 to 11 carbons, an arylsulfonylamino radical of 6 to 11 carbons, a perfluoroacyloxy radical of 2 to 14 carbons, and a perfluoroacylamino radical of 2 to 14 carbons; where the substituents thereof are selected from the group consisting of Cl, Br, an acetyl radical, an alkyl radical of 1 to 6 carbons, an alkenyl radical of 2 to 6 carbons, an aryl radical of 6 to 10 carbons, an alkoxy radical of 1 to 6 carbons, an aryloxy radical of 6 to 10 carbons, an alkoxycarbonyl radical of 2 to 13 carbons, a hydroxyalkoxycarbonyl radical of 3 to 13 carbons, a chlorohydroxyalkoxycarbonyl radical of 4 to 13 carbons, and an epoxyalkoxycarbonyl radical of 4 to 13 carbons;

A1, A2 and A3 are nothing, the same or different, with the proviso that when A3 is nothing, only one of A1 and A2 can be nothing, and
when y=0,
A2 is nothing, and
A1 is selected from the group consisting of diradicals (1), (2), (3), (4) and (5):

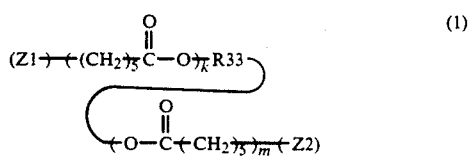
(1)

where
R33 is selected from the group consisting of an alkylene diradical of 2 to 8 carbons and an alkylene diradical of 2 to 8 carbons containing at least one atom selected from the group consisting of O, S and N atoms in the alkylene chain,
(Z1) and (Z2) show the relationship of the —A1— diradical to Z1— and Z2—, respectively, and
the sum of k and m is 3 to 50;

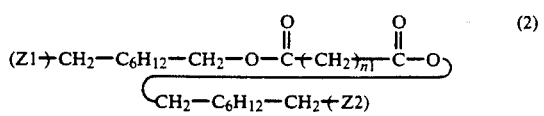
(2)

where
(Z1) and (Z2) show the relationship of the —A1— diradical to Z1 and Z2, respectively, and
n1 is 5 to 20;

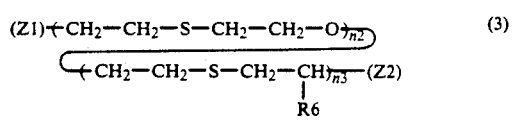
(3)

where
R6 is selected from the group consisting of H and a methyl radical,
(Z1) and (Z2) show the relationship of the —A1— diradical to Z1 and Z2, respectively,
n2 is 2 to 15 and
n3 is 0 to 3;

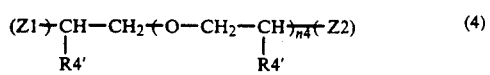
(4)

where
R4' is selected from the group consisting of H and a lower alkyl radical,
(Z1) and (Z2) show the relationship of the —A1— diradical to Z1 and Z2, respectively, and
n4 is 2 to 70; and (5) an aligomeric diradical selected from the group consisting of an oligomeric polybutadiene diradical, an oligomeric aliphatic polyester diradical an oligomeric polycaprolactone diradical, an oligomeric aromatic polyester diradical, an oligomeric aliphatic polycarbonate diradical, an oligomeric aliphatic polyamide diradical, an oligomeric aliphatic polyurethane diradical, an oligomeric aliphatic polyurea diradical, an oligomeric bisphenol A polycarbonate diradical, an oligomeric tetrabromobisphenol A polycarbonate diradical and an oligomeric bisphenol A-tetrabromobisphenol A co-polycarbonate diradical; and when y is 1,
the triradical $$-A1-R-A2-$$
$$\phantom{-A1-R-}|$$
$$\phantom{-A1-R}A3-$$

has a structure:

$$(Z1)-((CH_2)_{\overline{k}}C-O)_{\overline{k1}}CH_2-\underset{\underset{R44}{|}}{\overset{\overset{R7}{|}}{C}}-CH_2+O-\overset{O}{\underset{\|}{C}}-(CH_2)_{\overline{s}}(Z2)$$
$$+O-\overset{O}{\underset{\|}{C}}-(CH_2)_{\overline{s}})_{\overline{p1}}(Z3)$$

where (Z1), (Z2) and (Z3) show the relationship of the triradical to Z1, Z2, and Z3, respectively, R7 is selected from the group consisting of H and an alkyl radical of 1 to 6 carbons, R44 is selected from the group consisting of nothing and an alkylene diradical of 1 to 6 carbons, and the sum of k1, m1 and p1 is 2 to 20;

when y is 2 is 75,

A1 has a structure:

$$+CH_2-\underset{\underset{R8}{|}}{CH})_{\overline{s1}}$$

where

R8 is selected from the group consisting of a phenyl radical and an acetoxy radical, and s1 is 4 to 25; and when y is 2 to 75, A2 and A3 are nothing, and
triradical R has a structure:

$$+CH_2-\underset{\underset{R9+Z3)}{|}}{CH}+$$

where p R9 is selected from the group consisting of nothing and a methylene diradical, (Z3) shows the relationship between the triradical R group and Z3;

the compound of Structure A being preparable from a compound of Structure B:

$$T-X-A1+R)_{\overline{y}}A2-X-T \qquad B$$
$$\phantom{T-X-A1+R)_{\overline{y}}}|$$
$$\phantom{T-X-A1+R)_{\overline{y}}}A3-X-T$$

where

T is selected from the group consisting of H and a halocarbonyl radical;

where the compound of Structure B is reacted with a performance additive compound possessing at least one co-reactive group selected from the group consisting of a hydroxy radical, an amino radical, an epoxide radical, a carboxylic acid cyclic anhydride radical, a sulfocarboxylic cyclic acid anhydride radical, a haloformate radical and an isocyanate radical.

Another aspect of the present invention relates to novel processes for enhancing the flame retardance, UV stability, light stability and/or oxidative stability of engineering thermoplastic polymeric resins, such as aromatic polycarbonates (PC's); PC's blended with styrene maleic anhydride (SMA) copolymers; PC's blended with acrylonitrile butadiene styrene (ABS) copolymers; polyethylene terephthalate (PET); polybutylene terephthalate (PBT); polyphenylene oxide and its blends with polystyrene (PS) and high impact polystyrene (HIPS); styrene maleic anhydride (SMA) copolymers; acrylonitrile butadiene styrene (ABS) copolymers; polyethylene terephthalate (PET) blended with polybutylene terephthalate (PBT); nylons; polysulfones; etc.; by mixing about 0.05% to 10% by weight based on the weight of the engineering thermoplastic resin, of the novel single-functional and mixtures of multi-functional oligomeric performance additive compounds having one or more components of Structure A, at about 100° C. to 550° C., preferably about 150° C. to about 400° C., until intimately mixed.

Still another aspect of the present invention relates to novel compositions having enhanced flame retardance, UV stability, light stability and/or oxidative stability comprising about 0.05% to about 10% by weight, based on the weight of the engineering thermoplastic polymeric resin, of the novel single-functional and mixtures of multi-functional oligomeric performance additive compositions having one or more components of Structure A and about 90% to about 99.95% of at least one engineering thermoplastic polymeric resin, such as those resins and resin blends set forth above with respect to the process for enhancing the indicated performance properties. The performance additives become non-fugitive components of the engineering thermoplastic polymeric resin compositions.

Yet another aspect of the present invention relates to a process of producing a flame retardant aromatic polycarbonate resin composition comprising blending with the polycarbonate resin composition a compound having a Structure C:

$$\underset{H}{\overset{H}{\phantom{|}}}\underset{\phantom{|}}{\overset{\phantom{|}}{\phantom{|}}}\text{(benzene ring)}\quad \begin{array}{c}O\\\|\\C-O-R10\end{array} \qquad C$$
$$SO_3M$$

where

R10 is selected from the group consisting of:

an unsubstituted alkyl radical of 1 to 30 carbons, a substituted alkyl radical of 1 to 30 carbons, an unsubstituted aryl radical of 6 to 12 carbons, a substituted aryl radical of 6 to 12 carbons, an unsubstituted aralkyl radical of 7 to 16 carbons, a substituted aralkyl radical of 7 to 16 carbons, an unsubstituted biphenyl radical of 12 to 20 carbons and a substituted biphenyl radical of 12 to 20 carbons, where the substituents are selected from the group consisting of fluorine, chlorine and bromine, where the maximum number of substituents per radical does not exceed 12; and a UV stabilizing monoradical having a structure selected from the group consisting of structure (1), (2), (3) and (4):

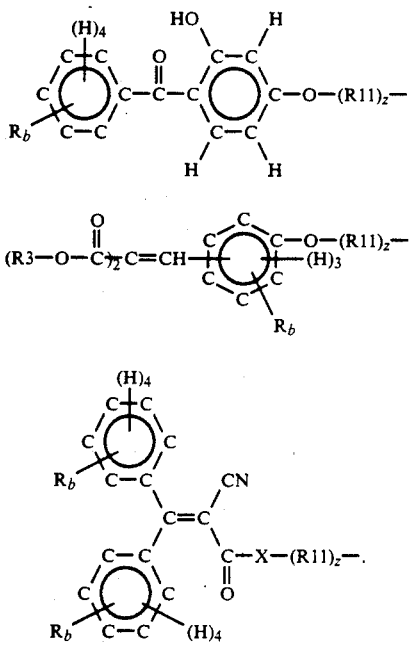

where

R3 is selected from the group consisting of an alkyl radical of 1 to 18 carbons, an aryl radical of 6 to 12 carbons and an aralkyl radical of 7 to 11 carbons;

R11 is an alkylene diradical of 1 to 6 carbons;

z is 0 or 1;

X is selected from the group consisting of NH and O, and $R_b$ is selected from the group consisting of hydrogen and a substituent selected from the group consisting of a lower alkyl radical, a lower alkloxy radical, a cyano radical, chloro, bromo and nitro; and

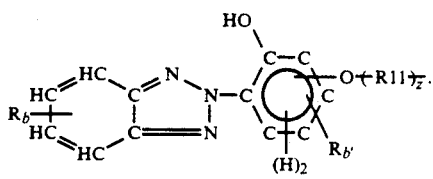

where $R_{b'}$ is selected from the group consisting of hydrogen and a substituent selected from the group consisting of a lower alkyl radical, a t-octyl radical an α-cumyl radical, a lower alkoxy radical, a cyano radical, chloro, bromo and nitro;

the compound of Structure C being present in an amount effective to provide flame retardance to the polycarbonate resin composition.

DETAILED DESCRIPTION OF THE PREFERRED EMBODIMENTS

Preparation of Novel Single-Functional and Mixtures of Multi-Functional Oligomeric Performance Additive Compounds The novel single-functional and mixtures of multi-functional oligomeric performance additive compounds of Structure A of this invention can be prepared by either reacting the performance additive functional groups, namely antioxidants (AO's), UV stabilizers, light stabilizers and/or flame retardants, possessing reactive acid halide, acid anhydride or haloformate groups, with oligomeric mono- or poly-hydroxy or amino compounds, or by reacting the performance additive functional groups possessing hydroxy or amino groups with co-reactive mono- or poly-haloformates (typically chloroformates) or mono- and poly-carbamoyl halides (typically carbamoyl chlorides) of oligomeric mono- or poly-hydroxy and amino compounds, usually in the presence of basic compounds.

In general, the basic compounds are inorganic bases, such as sodium hydroxide, potassium hydroxide, lithium hydroxide, sodium carbonate, potassium carbonate, sodium hydrogen carbonate and potassium hydrogen carbonate, and organic amines, such as pyridine, N,N-dimethylaniline, triethylamine, tributylamine and A1,4-diazabicyclo(2.2.2) octane.

AO's possessing acid halide or chloroformate reactive groups include, for example, 3,4-di-t-butyl-4-hydroxybenzoyl chloride,
3-(3,5-di-t-butyl-4-hydroxyphenyl)propionyl chloride,
3,5-di-t-butyl-4-hydroxybenzoyl bromide,
methylmercaptopropionyl chloride,
n-hexylmercaptopropionyl chloride,
n-dodecylmercaptopropionyl chloride,
n-octadecylmercaptopropionyl chloride,
n-hexylmercaptoacetyl chloride,
1,5-dichlorocarbonyl-3-thiapentane (i.e., the diacid dichloride of mercaptodipropionic acid),
diethyl chlorophosphite,
2-(3-(3,5-di-t-butyl-4-hydroxyphenyl) propionyloxy)ethyl chloroformate,
2-(3-(3,5-di-t-butyl-4-hydroxyphenyl)propionyloxy)propyl chloroformate and
2-(3,5-di-t-butyl-4-hydroxybenzoyloxy)propyl chloroformate.

In general, these reactive AO's may be prepared by reacting the corresponding antioxidant acid with an acid halogenating agent such as thionyl chloride, thionyl bromide, phosphorous trichloride, phosphorous pentachloride, phosgene (in the presence of N,N-dimethylformamide) and benzotrichloride. Alternately, the reactive AO's may be prepared by reacting the corresponding antioxidant alcohol (e.g., 2-(3-(b 3,5-di-t-butyl-4-hydroxyphenyl) propionyloxy)ethanol) with phosgene, followed by isolation of the antioxidant acid halide or chloroformate from the reaction mixture.

The AO's with acid halide or chloroformate groups are co-reactive with oligomeric ono- and poly-hydroxy and amino compounds. The hydroxy group on the phenyl ring of reactive hindered phenol AO's is relatively non-reactive with acid halide or chloroformate groups.

AO's possessing hydroxy groups which are reactive with oligomers having co-reactive chlorocarbonyl groups, e.g., mono- or polychloroformates or monoand poly-carbamoyl chlorides of oligomeric mono- or poly-hydroxy and amino compounds, include, for example, 2-(3-(3,5-di-t-butyl-4-hydroxyphenyl) propionyloxy)ethanol and 2-(3,4-di-t-butyl-4-hydroxybenzoyloxy)propanol.

UV stabilizers possessing acid halide or chloroformate reactive groups include, for example,
2-(4-benzoyl-3-hydroxyphenoxy)acetyl chloride,
2-(4-benzoyl-3-hydroxyphenoxy)ethyl chloroformate,
2-(4-benzoyl-3-hydroxyphenoxy)propyl chloroformate,
2-cyano-3,3-diphenyl-2-propenoyl chloride,
2-(2-cyano-3,3-diphenyl-2-propenoyloxy)ethyl chloroformate,
2-(2-hydroxy-4-(2-chlorocarbonylmethoxy)phenyl)-2H-benzotriazole,
2-(2-hydroxy-4-(2-chlorocarbonyloxyethoxy) phenyl)-2H-benzotriazole and
dimethyl or diethyl 3- or 4-chlorocarbonyloxyethoxybenzylidene malonates.

UV stabilizers possessing hydroxy groups which are reactive with oligomers having co-reactive chlorocarbonyl groups, e.g., mono- or poly-chloroformates, or mono- and poly-carbamoyl chlorides of oligomeric mono- or poly-hydroxy ad amino compounds,, include, for example,
2-(4-benzoyl-3-hydroxyphenoxy)ethanol,
2-(4-benzoyl-3-hydroxy-phenoxy)propanol,
2-(2-cyano-3,3-diphenyl-2-propenoyloxy)ethanol,
2-(2-hydroxy-4-(2-hydroxyethoxy)phenyl)-2H-benzotriazole and dimethyl or diethyl 3- or 4-(2-hydroxyethoxy) benzylidene malonates.

Light stabilizers possessing acid halide or chloroformate reactive groups include, for example, 4-chlorocarbonyloxy-2,2,6,6-tetramethylpiperdine hydrochloride and 4-chlorocarbonyloxy-1,2,2,6,6-pentamethylpiperdine hydrochloride.

Light stabilizers possessing groups which are reactive with oligomers having co-reactive chlorocarbonyl groups, e.g., mono- or polychloroformates or mono- and poly-carbamoyl chlorides of oligomeric mono- or poly-hydroxy and amino compounds, include, for example, 4-amino-2,2,6,6-tetramethylpiperdine, 4-amino-1,2,2,6,6-pentamethylpiperidine and 1,2,2,6,6-pentamethyl-4-piperidiol.

Reactive fire retardant intermediates possessing acid anhydride, acid halide or chloroformate reactive groups include, for example,
3,4,5,6-tetrachlorophthalic anhydride,
3,4,5,6-tetrabromophthalic anhydride,
2-sulfobenzoic acid anyhydride,
3,4,5,6-tetrabromo-2-sulfobenzoic acid anhydride,
3,4,5,6-tetrabromo-2-(ethoxy-carbonyl)benzoyl chloride,
3,4,5,6-tetrabromo-2-(3,6,9,12,15,18,21-heptaoxadocosoxycarbonyl) benzoyl chloride,
N-(chlorocarbonylmethyl)-3,4,5,6-tetrabromophthalimide,
4-bromophenyl choroformate,
2,4,6-tribromophenyl chloroformate and di(isopropylphenyl) chlorophosphate.

In general, cyclic carboxylic anhydrides, such as 3,4,5,6-tetrachlorophthalic anhydride and 3,4,5,6-tetrabromophthalic anhydride, react with hydroxy compounds to form 2-carboxybenzoates (acid phthalates) which are usually unstable thermally. At elevated temperatures they decompose to produce the starting reactants, i.e., the alcohol and the cyclic carboxylic anhydride. In order to prevent this from happening, the 2-carboxybenzoate is further esterified with alcohols or with epoxides to form the corresponding alkyl alkyl' phthalates or alkyl 2-hydroxyalkyl' phthalates. Epoxides useful in this respect include, for example, ethylene oxide, propylene oxide, 1,2-butylene oxide, styrene oxide, cyclohexene oxide and epichlorohydrin.

Fire retardants possessing hydroxy groups which are reactive with oligomers having co-reactive chlorocarbonyl groups, e.g., mono- or poly-chloroformates or mono- and poly-carbamoyl chlorides of oligomeric mono- or poly-hydroxy and amino compounds, include, for example, 4-bromophenol, 2,4,6-tribromophenol, the mono-potassium salt of 2-sulfo-1,4-dihydroxybenzene, N-(2-hydroxyethyl)-3,4,5,6-tetra-bromophthalimide and ethyl-2-hydroxypropyl-3,4,5,6-tetrabromophthalate.

When reacting the performance additive functional groups (AO's, UV stabilizers, light stabilizers and/or flame retardants) having acid chloride, acid anhydride and/or chloroformate groups with oligomeric mono- or poly-hydroxy and amino compounds, the reactive performance additive functional groups can be partially replaced with reactive compounds that do not possess performance additive functions. The latter include, for example, acid chlorides, such as acetyl chloride, 2-ethylhexanoyl chloride, pivaloyl chloride dodecanoyl chloride, neodecanoyl chloride, benozyl chloride, 4-methylbenzoyl chloride, 2-naphthoyl chloride, acryloxy chloride, undecylenoyl chloride and ethyl 2-chlorocarbonyl benzoate; chloroformates, such as methyl chloroformate, isopropyl chloroformate, phenyl chloroformate, 2-ethylhexyl chloroformate, dodecyl chloroformate, 2-phenoxyethyl chloroformate and allyl chloroformate; isocyanates, such as methyl isocyanate, propyl isocyanate, 2-(4-isopropenylphenyl)-2-propyl isocyanate and phenyl isocyanate; carbamoyl chlorides, such as N,N-dimethylcarbamoyl chloride; sulfonyl chlorides, such as methylsulfonyl chloride, phenylsulfonyl chloride and p-tolylsulfonyl chloride; perfluoro carboxylic acid chlorides, such as trifluoroacetyl chloride and perfluoroheptanoyl chloride; diketene; ketene; 2,2,6-trimethyl-4H-1,3-dioxin-4-one (a diketene precursor); and acid anhydrides, such as acetic anhydride, propionic anhydride, succinic anhydride, decenylsuccinic anhydride, itaconic anhydride, glutaric anhydride, phthalic anhydride, 4-methylphthalic anhydride, 4-nitrophthalic anhydride, trimellitic anhydride, pyromellitic dianhydride, benzophenone dianhydride, tetrahydrophthalic anhydride, hexahydrophthalic anhydride.

In general, cyclic carboxylic anhydrides, such as succinic anhydride, glutaric anhydride, phthalic anhydride, hexahydrophthalic anhydride, and others, react with hydroxy compounds to form 2-, 3- or 4-carboxycarboxylates which are usually unstable thermally. At elevated temperatures they decompose to produce the starting reactants, i.e., the alcohol and the cyclic carboxylic anhydride. In order to prevent this from happening, the 2-, 3- or 4-carboxy-carboxylate is further esterified with alcohols or with epoxides to form the corresponding alkyl alkyl' dicarboxylate or alkyl 2-hydroxyalkyl' dicarboxylate. Epoxides useful in this respect include, for example, ethylene oxide, propylene oxide, 1,2-butylene oxide, styrene oxide, cyclohexene oxide and epichlorohydrin.

Oligomeric mono- or ply-hydroxy and amino compounds which are reactive with AO's, UV stabilizers, light stabilizers and flame retardants possessing reactive acid halide, acid anhydride or chloroformate groups include, for example, oligomeric bisphenol A polycarbonates, tetrabromobisphenol A polycarbonates and copolycarbonates possessing hydroxy and groups, oligomeric aliphatic polycarbonates possessing hydroxy end groups (such as PPG's Duracarb ® polycarbonate oligomers); oligomeric aliphatic and aromatic polyesters possessing hydroxy end groups (such as Witco's Fomrez ® aliphatic polyester oligomers and King Industries' K-Flex ® oligomers); oligomeric polycaprolactones possessing hydroxy end groups (such as Union Carbide's TONE ® oligomers); oligomeric polyethers possessing hydroxyl or amino end groups (such as Union Carbide's Carbowax ® and Niax ® oligomers, PRC's Permapol ® polyetherpolysulfide diol oligomers, and Texaco's Jerramine ® amino terminated polyether oligomers); oligomeric partially hydrolyzed poly(vinyl acetates); oligomeric poly(styrene-co-allyl alcohol); and oligomeric polybutadienes possessing hydroxy end groups.

The above mono- and poly-hydroxy and amino oligomers can be converted to chloroformates or carbamoyl chlorides, e.g., mono- or poly-chloroformates or mono- and poly-carbamoyl chlorides of oligomeric mono- or poly-hydroxy and amino comounds, and subsequently reacted with hydroxy-substituted AO's, UV stabilizers, light stabilizers and flame retardants, in the presence of appropriate basic compounds to produce the compositions of the present invention.

As indicated above, generally, either the performance additives or the oligomers with which they are reacted can contain various corresponding reactive substituents. In general, the reaction conditions for the performance additives with the oligomeric comounds involving the corresponding reactive substituents set forth above are such that the mole ratio of hydroxyl (or amino) groups to chloroformate (or carbamoyl chloride) groups is between about 3.0 and about 0.5, preferably between about 1.25 and about 0.75, and most preferably between about 1.1 and about 0.9. The reaction temperature is between about −50° C. and about 150° C., preferably between about −10° C. and about 75° C. and most preferably between about 0° C. and about 50° C.

A solvent may or may not be needed, depending upon the reactants used. If a solvent is used, the solvent should be capable of dissolving the reactants without reacting with them. Examples of suitable solvents are hydrocarbon solvents, such as hexane and toluene; ether solvents, such as tetrahydrofuran, methyl t-butyl ether and glyme; chlorinated hydrocarbon solvents, such as methylene chloride, chloroform and chlorobenzene; and ester solvents, such as ethylacetate and butyl acetate.

A base may also be used to neutralize hydrogen chloride given off during the course of the reaction. Examples of suitable bases are sodium hydroxide, potassium hydroxide, sodium (or potassium) carbonate or bicarbonate, triethyl amine, tributyl amine and pyridine. The mole ratio of base to chloroformate is between about 1.0 and about 5.0. In addition, a nucleophilic catalyst may be used to accelerate the reaction rate. Such catalysts are known in the literature, with an example being p-N,N-dimethylaminopyridine. The mole ratio of catalyst to chloroformate is between about 0.001 and about 0.1.

As indicated above, the experiments involving fire retardant oligomeric performance additives led to the discovery that the compounds of Structure C, generally referred to herein as "sulfobenzoic acid compounds and derivatives," themselves provide flame retardant properties when reacted with or blended with aromatic polycarbonate resin compositions. Some of the compounds of Structure C are known compounds, however, none are known to have been used as fire retardants for aromatic polycarbonates. Moreover, the compounds in which R10 has a structure corresponding to UV stabilizing structures (1) through (4) are believed to be novel compounds themselves and provide combined UV stabilizing and flame retardant properties to aromatic polycarbonates.

To produce a non-fugitive fire retardant polymer or co-polymer including an aromatic polycarbonate in which the fire retardant properties are provided by the sulfobenzoic acid compounds and derivatives of the present invention, about 0.01% to about 10%, based on the weight of the polymer or co-polymer, of the sulfobenzoic acid compound or derivative is blended with the polymer or co-polymer.

To make oligomeric additive comounds including the sulfobenzoic acid comounds and derivatives as the performance additives, the general reaction conditions are as follows: The oligomer is dissolved in a suitable solvent, such as dry toluene, methylene chloride, ethyl acetate or butyl acetate, and an anhydrous base such as sodium (or potassium) carbonate or bicarbonate is added. Then the sulfobenzoic acid cyclic anhydride compound is added to the well stirred suspension. The reaction mixture is heated until the evolution of carbon dioxide has ceased. The unreacted base can either be removed by filtration or by washing with aqueous acid until a pH 5-7 has been obtained. The mole ratio of base to sulfobenzoic acid cyclic anhydride is between about 1 and about 5, and preferably between about 1.5 and about 3.0. the mole ratio of hydroxyl groups (on the oligomer) to sulfobenzoic acid cyclic anyhydride is between about 10 and about 0.8, and preferably between about 5 and about 0.9, and the reaction temperature is between about 25° C. and about 150° C.

The following illustrative, non-limiting examples are included for the purpose of further describing and explaining the preparation and use of the oligomeric performance additives of the present invention. Examples 1 through 26 illustrate the preparation of various types of oligomeric performance additives according to the present invention.

EXAMPLE 1

Endcapping TONE ® 260 with 2-Sulfobenzoic Acid Cyclic Anhydride, Sodium Hydrogen Carbonate as the Base (Compound I-1)

A three-neck round-bottom flask, fitted with a nitrogen inlet line, a thermometer, and a Friedrich condenser possessing a mineral oil bubbler, was charged with 50.0 g (32.9 m.e.q.) of TONE ® 260 (an oligomeric polycarpolactone based diol, having a molecular weight of ca. 3000 based on a hydroxyl content of 1.12%, manufactured by Union Carbide Corporation) and 150 mL of dry toluene. After the TONE ® 260 dissolved, a clear, colorless solution was obtained. Anhydrous, powdered sodium hydrogen carbonate (6.0 g; 71.4 mmoles) was added, and the magnetically stirred suspension was purged with dry nitrogen for 10 minutes. Next, 6.84 g (35.3 mmoles) of technical grad 2sulfobenzoic acid cyclic anhydride were quickly added in one portion. The nitrogen flow was shut off, and the stirred mixture was gradually warmed in an oil bath to 100° C. over approximately 120 minutes during which time carbon dioxide evolution was observed. After the evolution of carbon dioxide ceased (ca. 2-3 hours), the reaction mixture was cooled to room temperature and poured into 1.0 L of fresh toluene. The resulting toluene mixture was then suction filtered through a 350 mL coarse fritted glass filter funnel to which about 15 g of Celite 503 filter aid had been added. The spent filter cake was washed with fresh toluene, and the combined toluene filtrates were stripped of volatiles using a water aspirator and a rotary evaporator. A viscous oil was obtained which still contained toluene. The residual toluene was removed by heating the oil, under approximately 1.0 mm vacuum, to 110° C. for 15 minutes.

Upon cooling, 59.3 g (theory, 56.8 g) of an off white waxy solid material was obtained. The sulfur analysis expected was 1.86% and the sulfur analysis found was 1.8%. An infrared (IR) spectrum of the product showed the expected absorption bands at 1026 $cm^{-1}$ for the sulfonic acid salt group and at 660 $cm^{-1}$ and 619 $cm^{-1}$ for the aromatic group. These bands were not present in the starting TONE ® 260. Based on the method of preparation and analyses, the product formed in this reaction, I-1, was a disodium salt of bis(2-sulfobenzoyloxy) endcapped TONE ® 260, a disodium disulfonic acid salt.

EXAMPLE 2

Endcapping TONE ® 260 with 2-Sulfobenzoic Acid Cyclic Anhydride, Potassium Carbonate as the Base (Compound I-2)

100.2 g (66.0 m.e.q.) of TONE ® 260, 13.4 g (69.1 mmoles) of technical grade 2-sulfobenzoic cyclic anhydride, and 18.8 g (136.0 mmoles) of potassium carbonate were allowed to react in 500 mL of dry toluene using a method similar to the one employed in Example 1. The reaction mixture was diluted with 1.5 L of fresh toluene, and was suction filtered through a bed of Celite 503 filter aid. After removal of the volatiles as in example 1, 112.7 g (theory, 114.9 g) of a light yellow waxy solid were obtained. The sulfur analysis expected was 1.84% and the sulfur analysis found was 2.0%. The potassium analysis expected was 2.25% and the potassium analysis found was 2.5%. Based on the method of preparation and analyses, the product formed in this reaction, I-2, was a dipotassium salt of bis(2-sulfobenzoyloxy) endcapped TONE ® 260, a dipotassium disulfonic acid salt.

EXAMPLE 3

Endcapping TONE ® 260 with 2-Sulfobenzoic Acid Cyclic Anhydride, Potassium Hydrogen Carbonate as the Base (Compound I-2)

50.0 g (32.9 m.e.q.) of TONE ® 260, 6.9 g (35.6 mmoles) of technical grade 2-sulfobenzoic cyclic anhydride, and 6.0 g (60.0 mmoles) of anhydrous potassium hydrogen carbonate were allowed to react in 250 mL of dry toluene using a method similar to the one employed in Example 1. The reaction mixture was diluted with 600 mL of fresh toluene, and was suction filtered twice through a bed of Celite 503 filter aid. After removal of the volatiles as in Example 1, 55.2 g (theory, 57.3 g) of a light yellow waxy solid were obtained. The sulfur analysis expected was 1.84% and the sulfur analysis found was 1.6%. An infrared (IR) spectrum of the product showed the expected absorption bands at 1024 $cm^{-1}$ for the sulfonic acid salt group and at 660 $cm^{-1}$ and 619 $cm^{-1}$ for the aromatic group. These bands were not present in the starting TONE ® 260. Based on the method of preparation and analyses, the product formed in this reaction, I-2, was a dipotassium salt of bis(2-sulfobenzoyloxy) endcapped TONE ® , a dipotassium disulfonic acid salt.

EXAMPLE 4

Endcapping TONE ® 260 with 2-Sulfobenzoic Acid Cyclic Anhydride, Sodium Carbonate as the Base (Compound I-1)

100.2 g (65.9 m.e.q.) of TONE ® 260, 13.4 g (69.3 mmoles) of technical grade 2-sulfobenzoic cyclic anhydride, and 14.4 g (136.0 mmoles) of anhydrous sodium carbonate were allowed to react in 500 mL of dry toluene using a method similar to the one employed in Example 1, except that the reaction mixture was heated to 100° C. over 1 hour instead of 2 hours, and that the total reaction time was 2 hours rather than 4-5 hours. The reaction mixture was diluted with 1.5 L of fresh toluene, and was suction filtered through a bed of Celite 503 filter aid. After removal of the volatiles as in Example 1, 112.7 g (theory, 113.6 g) of a yellow waxy solid was obtained. The sulfur analysis expected was 1.86% and the sulfur analysis found was 1.7%. The sodium analysis found was 1.0%. An infrared (IR) spectrum of the product showed the expected absorption bands at 1026 $cm^{-1}$ for the sulfonic acid salt group and at 660 $cm^{-1}$ and 619 $cm^{-1}$ for the aromatic group. These bands were not present in the starting TONE ® 260. Based on the method of preparation and analyses, the product formed in this reaction, I-1, was a disodium salt of bis(2-sulfobenzoyloxy) endcapped TONE ® 260, a disodium disulfonic acid salt.

EXAMPLE 5

Endcapping A Monohydroxy-Terminated Polycaprolactone Oligomer with 2-Sulfobenzoic Acid Cyclic Anhydride, Sodium Hydrogen Carbonate as the Base (Compound I-3)

A mixture containing 100.0 g (876 mmoles) of caprolactone, 11.6 g (100.0 mmoles) of n-heptanol, and 0.01 g of potassium carbonate was heated under nitrogen to 175° C. for 44 hours. The resultant waxy solid (yield=111 g) assayed for 0.6% residual n-heptanol, 0.3% residual caprolactone, and the desired polycaprolactone oligomer containing 1.4% by weight of hydroxyl. The latter indicated that the oligomer had about 9 caprolactone repeat units and that the molecular weight of the oligomer was about 1200.

Next, 50.0 g (41.2 mmoles) of the above oligomer, 8.8 g (45.4 mmoles) of technical grade 2-sulfobenzoic acid anhydride, and 10.4 g (124.0 mmoles) of anhydrous sodium hydrogen carbonate were allowed to react in 300 mL of dry toluene using a method similar to that employed in Example 1. The reaction mixture was diluted with 300 mL of fresh toluene and was suction filtered through a bed of Celite 503 filter aid. After removal of volatiles as in Example 1, 56.6 g (theory, 58.5 g) of a tan wax was obtained. The sulfur analysis expected was 2.26% and the sulfur analysis found was 1.7%. Based on the method of preparation and analyses, the product formed in this reaction, I-3, was a monosodium salt of mono-(2-sulfobenzoyloxy)polycaprolactone oligomer.

EXAMPLE 6

Partial Endcapping of Duracarb ® 120 with 2-Sulfobenzoic Acid Cyclic Anhydride, Potassium Hydrogen Carbonate as the Base (Compounds I-4a and I-4b)

In this example 50.0 g (122.9 m.e.q.) of Duracarb ® 120 (an aliphatic polycarbonate oligomeric diol, having a molecular weight of about 850 based on a hydroxyl content of 4.18 weight %, manufactured by PPG Industries), 12.0 g (61.9 mmoles) of technical grade 2-sulfobenzoic cyclic anhydride, 12.0 g (1220.0 mmoles) of anhydrous potassium carbonate, and 12.0 g of crushed 4A molecular sieves were allowed to react in 300 mL of dry toluene using a method similar to the one employed in Example 1, except that the reaction mixture was heated to 100° C. over 1 hour instead of 2 hours and that the total reaction time was 2 hours rather than 4-5 hours. The reaction mixture was diluted with 1.0 L of fresh toluene, and was suction filtered twice through a bed of Celite 503 filter aid. A small amount of toluene insoluble, gel-like material was recovered from the bottom of the filter flask after the toluene solution was removed for stripping. After drying under vacuum, 1.2 g of toluene insoluble solid were obtained. This was thought to be the di-endcapped oligomer.

After removal of the volatiles as in Example 1, 48.8 g (theory, 63.7 g) of a light yellow waxy solid was obtained from the toluene solution. The sulfur analysis expected for the toluene soluble fraction was 3.1% (mono-endcapped) and the sulfur analysis found was 2.6%. The sulfur analysis expected for the toluene insoluble soluble fraction was 6.2% (di-endcapped) and the sulfur analysis found was 5.1%. An infrared (IR) spectrum of the toluene soluble product showed the expected absorption bands at 1023 cm$^{-1}$ for the sulfonic acid salt group and at 660 cm$^{-1}$ and 619 cm$^{-1}$ for the aromatic group. These bands were not present in the starting Duracarb ® 120. Based on method of preparation and analyses, the products formed in this reaction were as follows: The toluene soluble product, I-4a, was the mono-endcapped product (the monopotassium salt of mono(2-sulfobenzoyloxy) endcapped Duracarb ® 120) and the toluene insoluble product, I-4b, was the di-endcapped product (the dipotassium salt of bis(2-sulfobenzoyloxy) endcapped Duracarb ® 120).

EXAMPLE 7

Endcapping of Duracarb ® 120 with 2-Sulfobenzoic Acid Cyclic Anhydride and Tetrabromophthalic Anhydride, Followed by Reaction with Epichlorohydrin (Compounds I-5a, I-5b and I-5c)

In this example 50.0 g (122.9 m.e.q.) of Duracarb ® 120, 8.0 g (80.0 mmoles) of anhydrous sodium carbonate, and 8.0 g (41.3 mmoles) of crushed 4A molecular sieves were allowed to react in 300 mL of dry toluene with 8.0 g of technical grad 2-sulfobenzoic cyclic anhydride, using a method similar to the one employed in Example 1, except that the reaction mixture was heated to 110° C. over 1 hour instead of 2 hours, and that the total reaction time was 2 hours rather than 4-5 hours. The cooled reaction mixture was then suction filtered through a bed of Celite 503 filter aid and the filter cake was washed with a small amount of fresh toluene. The combined toluene solutions were then added to an Erlenmeyer flask, whereupon 38.8 g (82.0 mmoles) of tetrabromophthalic anhydride (TBPA) and 1.5 g (15.3 mmoles) of potassium acetate were added. A Friedrich condenser was attached to the flask and the magnetically stirred suspension was warmed to 100° C. over a period of 30 minutes. At this point, all of the TBPA was in solution. Then 11.4 g (123.0 mmoles) of epichlorohydrin were added and the solution was stirred for an hour at 100° C. The cooled solution was filtered through a bed of Celite 503 filter aid and the filter cake was washed with a small amount of fresh toluene. The toluene solutions were then combined.

After removal of the volatiles as in Example 1, 99.2 g (theory, 104.7 g) of a faintly yellow waxy solid were obtained. The sulfur analysis expected was 1.25% and the sulfur analysis found was 1.2%. The bromine analysis expected was 25.0% and the bromine analysis found was 24.7%. Hence, the product obtained was the desired product containing 2-(potassium sulfo)benzoyloxy end groups and 2-(chlorohydroxypropoxycarbonyl)-3,4,5,6-tetrabromobenzoyloxy end groups in an equivalent ratio of about 1 to 2. An infrared (IR) spectrum of the toluene soluble product showed the expected absorption bands at 1022 cm$^{-1}$ for the sulfonic acid salt group and at 660 cm$^{-1}$ and 618 cm$^{-1}$ for the aromatic group. These bands were not present in the starting Duracarb ® 120. Based on method of preparation and analyses, the product formed in this reaction was a mixture of a bis(2-chlorohydroxypropoxycarbonyl) endcapped Duracarb ® 120 oligomer (I-5a), a disodium salt of a bis(2-sulfobenzoyloxy) endcapped Duracarb ® 120 oligomer (I-5b), and a monosodium salt of a mono(2-chlorohydroxypropoxycarbonyl)3,4,5,6-tetrabromobenzoyloxy, mono(2-sulfobenzoyloxy) endcapped Duracarb ® 120 oligomer (I-5c).

EXAMPLE 8

Endcapping Fomrez ® 53 with 2-Sulfobenzoic Acid Cyclic Anhydride, Potassium Hydrogen Carbonate as the Base (Compound I-6)

50.0 g (46.5 m.e.q.) of Fomrez ® 53 (an aliphatic branded glycol adipate polyester, having a molecular weight of about 2100 based on a hydroxyl content of 1.58 weight %, manufactured by Witco Chemical Corp.), 10.0 g (100.0 mmoles) of anhydrous potassium hydrogen carbonate and 300 mL of dry toluene were magnetically stirred and simultaneously purged with nitrogen at room temperature for about 10 minutes. Then 9.2 g (47.5 mmoles) of technical grade 2-sulfobenzoic cyclic anhydride were added to the suspension in one portion. A Friedrich condenser with an attached mineral oil bubbler was placed on top of the flask, and the mixture was heated to reflux for about 2 hours. After cooling, the reaction mixture was suction filtered through a bed of Celite 503 filter aid and the filter cake was washed with fresh toluene. The toluene solutions were combined.

After removal of the volatiles as in Example 1, 66.3 g (theory, 60.3 g) of a viscous light yellow oil was obtained. The sulfur analysis expected was 2.47% and the sulfur analysis found was 2.1%. The above theory yield and the below theory sulfur analysis indicated that the product was contaminated with solvent. An infrared (IR) spectrum of the product showed the expected absorption bands at 1026 cm$^{-1}$ for the sulfonic acid salt group and at 660 cm$^{-1}$ and 617 cm$^{-1}$ for the aromatic group. These bands were not present in the starting Fomrez ® 53. Based on the method of preparation and analyses, the product formed in this reaction, I-6, was a dipotassium salt of a bis(2-sulfobenzoyloxy) endcapped Fomrez ® 53 oligomer, a dipotassium salt of a disulfonic acid.

EXAMPLE 9

Endcapping TONE ® 260 with 3,5-Di-t-butyl-4-hydroxybenzoyl Chloride (Compound I-7)

A solution of 20.0 g (13.2 m.e.q) of TONE ® 260 and 2.0 g (25.3 mmoles) of pyridine in 75 mL of methylene chloride was purged with nitrogen. This solution was cooled in a slat-ice bath and to it was added (over a period of 30 minutes) a solution consisting of 3.79 g (14.1 mmoles) of 3,5-di-t-butyl-4-hydroxybenzoyl chloride in 25 mL of methylene chloride. The reaction mixture was allowed to warm to room temperature over a period of 60 minutes and was then warmed to reflux for 60 minutes. After cooling, the mixture was washed once with 10% aqueous HCl solution, twice with water and once with 2% sodium hydrogen carbonate solution. The solution was then dried over 5% by weight of anhydrous magnesium sulfate, and, after separation of the spent desiccant by filtration, the solvent was removed from the solution in vacuo.

The product was 21.8 g (theory, 23.1 g) of a waxy white solid. The product was contaminated with 0.5% 3,5-di-t-butyl-4-hydroxybenzoic acid according to liquid chromatographic (LC) analysis. An infrared (IR) spectrum of the product showed the expected absorption bands at 1461 cm$^{-1}$ and 1435 cm$^{-1}$ for the aromatic group which were not present in the starting TONE ® 260 oligomer. Based on the method of preparation and analyses, the product formed in this reaction, I-7, was a bis(3,5-di-t-butyl-4-hydroxybenzoyloxy) endcapped TONE ® 260 oligomer.

EXAMPLE 10

Endcapping of Other Diol Oligomers with 3,5-Di-t-butyl-4-hydroxybenzoyl Chloride (Compounds I-8 and I-9)

Employing the procedure used in Example 9, two other oligomeric diols, Permapol ® P-900 (an oligomeric polyether-polysulfide diol, having a molecular weight of about 500 based on a hydroxyl content of 6.91 weight %, manufactured by PRC Corp.) and K-Flex ® 148 (an aliphatic oligomeric ester diol, having a molecular weight of about 500 based on a hydroxyl content of 7.01 weight %, manufactured by King Industries), were endcapped with 3,5-t-butyl-4-hydroxybenzoyl chloride (AO BCl). The table below summarizes the quantities of reactants and the yield information about each oligomer.

| Reactants | Quantity, g | Product Yield | |
|---|---|---|---|
| | | Theory, g | Actual, g |
| Permapol P-900 | 20.0 (81.3 meq.) | | |
| AO BCl | 21.8 (81.3 mmol.) | 38.8 | 37.2[1] (I-8) |
| Pyridine | 7.9 (100.0 mmol.) | | |
| K-Flex 148 | 23.8 (98.1 meq.) | | |
| AO BCl | 27.1 (101.0 mmol.) | 46.6 | 41.7[2] (I-9) |
| Pyridine | 16.0 (202.0 mmol.) | | |

[1] A light yellow oil.
[2] A straw colored viscous oil, IR spectrum showed carbonyl bands at 1715 cm$^{-1}$ and 1780 cm$^{-1}$ whereas K-Flex ® 148 showed a single carbonyl band at 1770 cm$^{-1}$.

Based on the method of preparation and analyses, I-8 was a bis(3,5-di-t-butyl-4-hydroxybenzoyloxy) endcapped Permapol ® P-900 oligomer. Based on the method of preparation and analyses, I-9 was a bis(3,5-di-t-butyl-4-hydroxybenzoyloxy) encapped K-Flex ® 148 oligomer.

EXAMPLE 11

Encapping TONE ® 260 with 3-(3,5-Di-t-butyl-4-hydroxyphenyl)propionyl chloride (Compound (I-10)

A solution of 21.2 g (14.0 m.e.q.) of TONE ® 260 and 1.8 g (22.8 mmoles) of pyridine in 50 mL of methylene chloride was purged with nitrogen. This solution was cooled in a salt-ice bath and to it was added (over a period of 60 minutes) a solution consisting of 4.5 g (15.2 mmoles) of 3-(3,5-di-t-butyl-4-hydroxyphenyl)propionyl chloride in 25 mL of methylene chloride. The reaction was completed and the product was worked-up as in Example 9. Obtained were 25.0 g (theory, 24.8 g) of a light yellow wax which was contaminated with 1.1% 3-(3,5-di-t-butyl-4-hydroxyphenyl)propionic acid according to LC analysis. An infrared (IR) spectrum of the product showed the expected absorption bands at 1471 cm$^{-1}$ and 1436 cm$^{-1}$ for the aromatic group which were not present in the starting TONE ® 260 oligomer. Based on the method of preparation and analyses, the product formed in this reaction, I-10, was a bis(3-(3,5-di-t-butyl-4-hydroxyphenyl)propionyloxy) endcapped TONE ® 260 oligomer.

EXAMPLE 12

Endcapping of Other Diol Oligomers with 3-(3,5-Di-t-butyl-4-hydroxyphenyl)propionyl Chloride (Compounds I-11 and I-12)

Employing the procedure used in Example 11 two other oligomeric diols, Permapol ® P-900 and K-Flex ® 148, were endcapped with 3-(3,5-t-butyl-4-hydroxyphenyl)propionyl chloride (AO PCl). The table below summarizes the quantities of reactants used and the yield information about each oligomer.

| Reactants | Quantity, g | Product Yield | |
|---|---|---|---|
| | | Theory, g | Actual, g |
| Permapol P-900 | 25.0 (101.6 meq.) | | |
| AO PCl | 29.5 (99.4 mmol.) | 50.9 | 45.7[1] (I-11) |
| Pyridine | 16.6 (210.0 mmol.) | | |
| K-Flex 148 | 23.8 (98.4 meq.) | | |
| AO PCl | 29.5 (99.4 mmol.) | 49.7 | 45.2[2] (I-12) |
| Pyridine | 7.9 (100.0 mmol.) | | |

[1] A straw yellow oil, IR spectrum showed ester carbonyl bands at 1730 cm$^{-1}$ and 1750 cm$^{-1}$, bands absent in starting Permapol ® P-900.
[2] A straw colored viscous oil, IR spectrum showed ester carbonyl bands and a very sharp hindered phenol band at 3650 cm$^{-1}$. The latter band was absent in K-Flex ® 148.

Based on the method of preparation and analyses, I-11 was a bis(3-(3,5-di-t-butyl-4-hydroxyphenyl)propionyloxy) endcapped Permapol ® P-900 oligomer.

Based on the method of preparation and analyses, I-12 was a bis(3-(3,5-di-t-butyl-4-hydroxyphenyl)propionyloxy) endcapped K-Flex ® 148 oligomer.

EXAMPLE 13

Endcapping TONE ® 260 with 2-(4-Benzoyl-3-hydroxyphenoxy)ethyl Chloroformate (Compound (I-13)

2-(4-Benzoyl-3-hydroxyphenoxy)ethyl chloroformate was prepared by initially reacting 2,4-dihydroxybenzophenone with ethylene oxide and subsequently converting the resulting 2-hydroxy-4-(2-hydroxyethoxy)benzophenone to the desired chloroformate via treatment with excess phosgene. Employing the procedure used in Example 11, 25.0 g (16.5 m.e.q.) of TONE ® 260 and 6.0 g (17.8 mmoles) of 2-(4-benzoyl-3-hydroxyphenoxy)ethyl chloroformate (95.4%) were reacted in the presence of 1.4 g (17.8 mmoles) of pyridine and 150 mL of methylene chloride. The reaction was completed and the product was worked up as in Example 9.

28.4 g (theory, 30.1 g) of a light yellow waxy solid were obtained. High performance LC (UV detector) indicated the presence of 2.5% of residual 2-hydroxy-4-(2-hydroxyethoxy)benzophenone in the product. There was also a very large increase in the UV absorption for the LC peak that corresponded to that of TONE ® 260. This demonstrated that the UV absorbing moiety was indeed attached to the TONE ® 260 oligomer and that the desired product was formed. Based on the method or preparation and analyses, the product formed in this reaction, I-13, was a bis(2-(4-benzoyl-3-hydroxyphenoxy)-ethoxycarbonyloxy) endcapped TONE ® 260 oligomer.

EXAMPLE 14

Endcapping TONE ® 260 with Diethyl Chlorophosphite (Compound I-14)

Employing the procedure used in Example 11, 50.0 g (32.9 m.e.q.) of TONE ® 260 and 6.2 g (38.8 mmoles) of 98% diethyl chlorophosphite were reacted in the presence of 5.0 g (49.4 mmoles) of triethylamine and 200 mL of methylene chloride. After the usual work-up, 50.1 g (theory, 54.0 g) of a white waxy solid was obtained. The phosphorous analysis expected for the desired product was 2.02%; that found was 1.89%. An infrared (IR) spectrum of the product showed the expected absorption bands at 1038 cm$^{-1}$ and 778 cm$^{-1}$ which show the presence of an aliphatic P—O—C bond in the product. Based on the method of preparation and anlayses, the product formed in this reaction, I-14, was a bis(diethoxyphosphinoxy) endcapped TONE ® 260 oligomer.

EXAMPLE 15

Endcapping TONE ® 220 with 3,3-Diphenyl-2-cyano-2-propenoyl Chloride (Compound I-15)

Employing the procedure used in Example 11, 10.0 g (19.8 m.e.q.) of TONE ® 220 (an oligomeric polycaprolactone diol, having a molecular weight of ca. 1000 based on a hydroxyl content of 3.37%, manufactured by Union Carbide Corporation) and 5.34 g (19.8 mmoles) of 99.2% 3,3-diphenyl-2-cyano-2-propenoyl chloride were reacted in the presence of 2.0 g (25.3 mmoles) of pyridine and 50 mL of dry methylene chloride. 12.9 g (theory, 14.6 g) of an amber waxy solid were obtained. High performance LC (UV detector) showed a very large increase in the UV absorption for the LC peak that corresponded to that of TONE ® 220. This demonstrated that the UV absorbing moiety was indeed attached to the TONE ® 220 oligomer and that the desired product was formed. The LC analysis also showed that the product was contaminated with less than 0.1 weight % 3,3-diphenyl-2-cyano-2-propenoic acid. An infrared (IR) spectrum of the product showed the expected absorption band at 2220 cm$^{-1}$ for the cyano group in the product. Based on the method of preparation and analyses, the product formed in this reaction, I-15, was a bis(3,3-diphenyl-2-cyano-2-propenoyloxy) endcapped TONE ® 220 oligomer.

EXAMPLE 16

Endcapping TONE ® 260 with 2-(4-Benzoyl-3-hydroxyphenoxy)ethyl Chloroformate and 3,5-Di-t-butyl-4-hydroxybenzoyl Chloride (Compounds I-16a, I-16b and I-16c)

Employing the procedure used in Example 11, 50.0 g (32.9 m.e.q.) of TONE ® 260, 4.74 g (17.6 mmoles) of 3,5-di-t-butyl-4-hydroxybenzoyl chloride and 5.88 g (17.6 mmoles) of 96.1% 2-(4-benzoyl-3-hydroxyphenoxy)ethyl chloroformate were reacted in the presence of 3.1 g (39.2 mmoles) of pyridine and 300 mL of methylene chloride. 55.6 g (theory, 58.5 g) of a light yellow waxy solid were obtained. High performance LC (UV detector) indicated the presence of 2.1% of residual 2-hydroxy-4-(2-hydroxyethoxy)benzophenone and less than 0.1% residual, 3,5-di-t-butyl-4-hydroxybenzoic acid in the product. An ultraviolet (UV) spectrum of the product showed lambda max. absorption bands at 224 nm, 254, nm, 284 nm, and 328 nm. Based on the method of preparation and analyses, the product formed in this reaction, I-16, was a mixture of a bis(2-(4-benzoyl-3-hydroxyphenoxy)ethoxycarbonyloxy) endcapped TONE ® 260 oligomer (I-16a), a bis(3,5-di-t-butyl-4-hdyroxybenzoyloxy) endcapped TONE ® 260 oligomer (I-16b) and a mono(3,5-di-t-butyl-4-hydroxybenzoyloxy), mono(2-(4-benzoyl-3-hydroxyphenoxy)ethoxycarbonyloxy) endcapped TONE ® 260 oligomer (I-16c).

EXAMPLE 17

Endcapping a Tetrabromobisphenol A Polycarbonate (PC) with 2-(4-Benzoyl-3-hydroxyphenoxy)ethyl Chloroformate (Compound I-17)

A 500 mL 4-necked flask was fitted with a mechanical stirrer, two addition funnels, and a Claisen adapter to which were connected a thermometer and a Dry Ice-filled Dewar condenser. A small Dry Ice-filled Dewar condenser was also attached to the addition funnel that held the liquid phosgene.

Next, 32.6 g (60.0 mmoles) of tetrabromobisphenol A, 0.2 g( 0.6 mmole) of tetrabutylammonium hydrogen sulfate (phase transfer catalyst), 53.2 g (60.0 mmoles) of 4.5% aqueous sodium hydroxide solution, and 100 mL of methylene chloride were added. The mixture was stirred and 5.02 g (15.0 mmoles) of 96% 2-(4-benzoyl-3-hydroxyphenoxy)ethyl chloroformate in 30 mL of methylene chloride were added dropwise over 10 minutes. After the reaction mixture was stirred an aditional 5 minutes, 8.3 mL (ca. 119.0 mmoles) of liquid phosgene and 12.0 g (150.0 mmoles) of 50% sodium hydroxide were added dropwise over 20 minutes. The reaction mixture was cooled as was necessary in order to hold the temperature between 20° and 25° C. Once the addition of phosgene was completed, 0.5 mL (ca. 4.9 mmoles) of triethylamine was added. The reaction mixture was stirred another 30 minutes. At the end of this time the pH of the aqueous phase was 12-14 according to pH paper. The phases were separated. The methylene chloride phase was washed once with dilute aqueous HCl solution and once with water. It was then added dropwise to 1.0 L of vigorously stirred methanol.

The resultant precipitate was filtered, washed with fresh methanol and dried in a vacuum oven to yield 30.1 g (theory, 38.3 g) of white powder. Analysis by high performance LC indicated the presence of less than 0.1 weight % residual 2-hydroxy-4-(2-hydroxyethoxy)benzophenone in the product. Analysis by ultraviolet (UV) spectroscopy showed that the product contained about .4 weight % of attached 2-(4-benzoyl-3-hydroxyphenoxy)ethoxycarbonyloxy) UV absorbing groups. Based on the method of preparation and analyses, the product formed in this reaction, I-17, was a bis(2-(4-benzoyl-3-hydroxyphenoxy)ethoxycarbonyloxy) endcapped tetrabromobisphenol A polycarbonate (PC) oligomer.

EXAMPLE 18

Endcapping a Bisphenol A Polycarbonate (PC) with 2-(4-Benzoyl-3-hydroxyphenoxy)ethyl Chloroformate (Compound I-18)

A 2.0 L 3-necked flask was fitted with a mechanical stirrer, a nitrogen inlet line, and a Claisen adapter to which was connected a Dry Ice-filled Dewar condenser and a thermometer. The nitrogen line was connected to a 100 mL flask to which was attached an addition funnel topped with a small Dry Ice-filled Dewar condenser. In this way a measured amount of liquid phosgene was added dropwise to the 100 mL flask where it vaporized and was swept by the nitrogen flow into the 2.0 L flask.

300 mL of dry methylene chloride, 57.1 g (250 mmoles) of bisphenol A, 160 g (2.022 moles) of pyridine, and 0.8 g (5.6 mmoles) of 4-(N,N-dimethylamino)-pyridine (a nucleophilic catalyst) were added to the 2.0 L flask. The stirred solution was purged with nitrogen for 10 minutes before 8.4 g (25.0 mmoles) of 95.4% 2-(4-benzoyl-3-hydroxyphenoxy)ethyl chloroformate in 25 mL of methylene chloride was added in one portion. After the reaction mixture was stirred for 90 minutes at 25°-30° C., an additional 300 mL of dry methylene chloride were added. Then 50.0 mL (ca. 723 mmoles) of liquid phosgene were added as a gas through the nitrogen line below the surface of the liquid, over a period of 30 minutes at 25°-30° C. After stirring the mixture for an additional 60 minutes, 25 mL of water were carefully added to destroy the excess phosgene. An additional 125 mL of water were added and the mixture was stirred for 30 minutes. The reaction mixture was then diluted with about 600 mL of methylene chloride and the methylene chloride phase was washed with 600 mL of 5% aqueous HCl, then with water. The methylene chloride solution was then added to 2.0 L of vigorously stirred methanol.

The resulting precipitate was separated by filtration and dried in a vacuum oven to yield 45.1 g (theory, 70.7 g) of light yellow powder. Analysis by high performance LC indicated that there was less than 0.1% of residual 2-hydroxy-4-(2-hydroxyethoxy)benzophenone in the product. The resulting endcapped bisphenol A PC had a stronger UV absorption according to LC than a similar bisphenol A PC endcapped with a phenol. Analysis by ultraviolet (UV) spectroscopy showed that the product contained about 2.5 weight % of attached 2-(4-benzoyl-3-hydroxyphenoxy)ethoxycarbonyloxy) UV absorbing groups. Based on the method of preparation and analyses, the product formed in this reaction, I-18, was a bis(2-(4-benzoyl-3-hydroxyphenoxy)ethoxycarbonyloxy) endcapped bisphenol A polycarbonate (PC) oligomer.

EXAMPLE 19

Endcapping of Jeffamine ® M-600 with 2-(4-Benzoyl-2-hydroxyphenoxy)ethyl Chloroformate (Compound I-19)

A solution of 11.8 g (35.0 mmoles) of 95.4% 2-(4-benzoyl-3-hydroxyphenoxy)ethyl chloroformate in 50 mL of dry methylene chloride was added at room temperature to 20.0 g (35.0 mmoles) of Jeffamine ® M-600 (a monoamino oligomeric polyether with a molecular weight of about 600 based on 2.80 weight % amino groups, produced by Texaco, Inc.) in 75 mL of dry methylene chloride. The resulting solution was stirred for 12 hours at room temperature. The reaction mixture was then washed four times with 5% aqueous sodium hydroxide solution and once with saturated sodium hydrogen carbonate solution. The solution was dried over anhydrous magnesium sulfate and after separation of the spent desiccant by filtration the methylene chloride was removed in vacuo.

26.1 g (theory, 29.9 g) of a light amber oil resulted. Analysis by high performance LC indicated that there was less than 0.1% of residual 2-hydroxy-4-(2-hydroxyethoxy)benzophenone in the product. The UV spectrum of the product was similar to that of 2-hydroxy-4-(2-hydroxyethoxy)benzophenone, which showed that the desired product was formed. Analysis bay ultraviolet (UV) spectroscopy showed that the product contained about 29.8 weight % (theory, 30.1 weight %) of attached 2-(4-benzoyl-3-hydroxyphenoxy)ethoxycarbonyloxy) UV absorbing groups. Based on the method of preparation and analyses, the product formed in this reaction, I-19, was a mono(2-(4-benzoyl-3-hydroxyphenoxy)ethoxycarbonylamino) endcapped Jeffamine ® M-600 oligomer.

EXAMPLE 20

Endcapping of Jeffamine ® D-400 with 3,5-t-Butyl-4-hydroxybenzoyl Chloride (Compound I-20)

18.7 g (69.6 mmoles) of 3,5-di-t-butyl-4-hydroxybenzoyl chloride were added to 15.0 g (69.6 m.e.q.) of Jeffamine ® D-400 (a diamino oligomeric polyether with a molecular weight of about 400 based on 7.43 weight % amino groups, produced by Texaco, Inc.) and 8.0 g (79.0 mmoles) of triethylamine in 100 mL of dry methylene chloride, employing the procedure used in Example 11. 26.9 g (theory, 31.2 g) of light yellow glassy material which contained less than 0.1 weight % residual 3,5-di-t-butyl-4-hydroxybenzoic acid were obtained. An infrared (IR) spectrum of the product showed the expected absorption band at 1733 cm$^{-1}$ for the carbonyl group. Based on the method of preparation and analyses, the product formed in this reaction, I-20, was a bis(2-(4-benzoyl-3-hydroxyphenoxy)ethoxycarbonylamino) endcapped Jeffamine ® D-400 oligomer.

EXAMPLE 21

Endcapping of Jeffamine ® D-400 with 3,5-Di-t-Butyl-4-hydroxybenzoic Acid and Methyl Hydrogen Tetrabromophthalate (Compound I-21a, I-21b and I-21c)

An Erlenmeyer flask was charged with 10.0 g (46.4 m.e.q.) of Jeffamine ® D-400, 5.9 g (23.2 mmoles) of 3,5-di-t-butyl-4-hydroxybenzoic acid, 4.8 g (23.3 mmoles) of dicyclohexylcarbodiimide, and 150 mL of dry tetrahydrofuran. The reaction mixture was then stirred overnight at room temperature. Then the precipitated dicyclohexyl urea was filtered off and was washed with fresh tetrahydofuran. 11.5 g (23.2 mmoles) of methyl hydrogen tetrabromophthalate were added to the combined tetrahydrofuran solutions. The resulting solution was concentrated and was placed in a 160° C. vacuum oven for 15 hours.

A greenish yellow solid was obtained which contained 0.5 weight % residual tetrabromophthalic anhydride and 1.4 weight % of residual 3,5-di-t-butyl-4-hydroxybenzoic acid according to high performance LC. An infrared (IR) spectrum of the product showed the expected absorption band at 1734 cm$^{-1}$ for the carbonyl group. Based on the method of preparation and analyses, the product formed in this reaction was a mixture of a bis(3,5-di-t-butyl-4-hydroxybenzoylamino) endcapped Jeffamine ® D-400 oligomer (I-21a), a bis(3,4,5,6-tetrabromophthalimido) endcapped Jeffamine ® D-400 oligomer (I-21b) and a mono(3,5-di-t-butyl-4-hydroxybenzoylamino), mono(3,4,5,6-tetrabromophthalimido) endcapped Jeffamine ® D-400 oligomer (I-21c).

EXAMPLE 22

Reaction of the Sodium Alkoxy Salt of 1,2,2,6,6-pentamethyl-4-piperidinol with TONE ® 220 Bischloroformate (Compound I-22)

TONE ® 220 bischloroformate was prepared from TONE ® 220 and excess phosgene. At room temperature, 11.34 g (20.0 m.e.q.) of TONE ® 220 bischloroformate in 75 mL of dry methylene chloride was reacted with 4.06 g (21.0 mmoles) of sodium 1,2,2,6,6-pentamethyl-4-piperidinoxide in 41.5 g of toluene. The reaction mixture was stirred for 40 minutes at room temperature, then washed twice with saturated aqueous sodium hydrogen carbonate solution and twice with water. The solution was then dried over about 5% by weight of anhydrous magnesium sulfate and after separation of the spent desiccant, the solvent was removed in vacuo.

This left 14.1 g (theory, 14.0 g) of a light yellow viscous liquid. Analysis by gas chromatography (GC) showed that no residual 1,2,2,6,6-pentamethyl-4-piperidinol was present. An infrared (IR) spectrum of the product showed the expected absorption bands at 1730 cm$^{-1}$ and 1735 cm$^{-1}$ for the carbonyl groups. Based on the method of preparation and analyses the product formed in this reaction, I-22, was a bis(1,2,2,6,6-pentamethyl-4-piperidinoxycarbonyloxy) endcapped TONE ® 220 oligomer.

EXAMPLE 23

Reaction of the Sodium Alkoxy Salt of 1,2,2,6,6-pentamethyl-4-piperidinol with Duracarb ® 120 Bischloroformate (Compound I-23)

Duracarb ® 120 bischloroformate was prepared from Duracarb ® 120 and excess phosgene. At room temperature, 9.4 g (20.0 m.e.q.) of Duracarb ® 120 bischloroformate in 150 mL of dry methylene chloride was reacted with 4.32 g (22.0 mmoles) of sodium 1,2,2,6,6-pentamethyl-4-piperidinoxide in 44.3 g of toluene. The reaction mixture was stirred for 40 minutes at room temperature, then washed twice with saturated aqueous sodium hydrogen carbonate solution and twice with water. The solution was then dried over about 5% by weight of anhydrous magnesium sulfate and after separation of the spent desiccant, the solvent was removed in vacuo leaving 11.5 g (theory, 12.1 g) of a yellow viscous liquid. An infrared (IR) spectrum of the product showed the expected absorption band at 140 cm$^{-1}$ for the carbonyl groups. A chloroformate carbonyl band at 1780 cm$^{-1}$ was absent. Based on the method of preparation and analyses, the product formed in this reaction, I-23, was a bis(1,2,2,6,6-pentamethyl-4-piperidinoxycarbonyloxy) endcapped Duracarb ® 120 oligomer.

EXAMPLE 24

Reaction of the Sodium Alkoxy Salt of 1,2,2,6,6-pentamethyl-4-piperidinol with Other Oligomeric Bischloroformates or Monochloroformates (Compounds I-24, I-25, I-26 and I-27)

Bischloroformates of Carbowax ® 1000 (a poly(oxyethylene) diol oligomer having a molecular weight of 1000 manufactured by Union Carbide Corp.), Niax ® 1025 (a poly(oxypropylene) diol oligomer having a molecular weight of 1000 manufactured by Union Carbide Corp.) a dihydroxy terminated polybutadiene (PBD) oligomer (having a molecular weight of about 2800 manufactured by Scientific Polymer, Inc.), and the monochloroformate of Carbowax ® 2000 (a poly(oxyethylene) monohydroxyl oligomer having a molecular weight of 1900, manufactured by Union Carbide Corp.), were synthesized by reacting the corresponding oligomeric diols or mono-hydroxyl oligomers with excess phosgene and isolation of the corresponding bischloroformate (BCF) or monochloroformate (MCF) by removing excess phosgene in vacuo. The reactions between the chloroformates and sodium 1,2,2,6,6-pentamethyl-4-piperidinoxide (SPPO) were carried out using the procedure set forth in Example 23. The table below summaries the quantities of reactants and solvents employed and the yield of bis(1,2,2,6,6-pentamethyl-4-piperidinoxycarbonyloxy) endcapped oligomer formed in each case.

| Solvent/ | | Product Yield | |
|---|---|---|---|
| Reactants | Quantity | Theory, g | Actual, g |
| Carbowax 1000 BCF | 1.125 g (2.0 meq.) | | |
| SPPO | 0.45 g (2.3 mmol.) | 1.4 | 0.6[1] (I-24) |
| Toluene | 4.6 g | | |
| Methylene Chloride | 15 mL | | |
| Carbowax 2000 MCF | 19.62 g (10.0 mmol.) | | |
| SPPO | 2.26 g (11.7 mmol.) | 21.0 | 19.2[2] (I-25) |
| Toluene | 23.1 g | | |
| Methylene Chloride | 75 mL | | |
| Niax 1025 BCF | 22.64 g (40 meq.) | | |
| SPPO | 8.10 g (42.0 mmol.) | 28.0 | 24.1[3] (I-26) |
| Toluene | 83.1 g | | |
| Methylene Chloride | 75 mL | | |
| PBD BCF | 29.95 g (20 meq.) | | |
| SPPO | 4.06 g (21.0 mmol.) | 31.9 | 31.6[4] (I-27) |
| Toluene | 41.5 g | | |
| Methylene Chloride | 75 mL | | |

[1] A yellow paste, IR spectrum showed carbonate carbonyl band at 1738 cm$^{-1}$.
[2] A white waxy solid, IR spectrum showed carbonate carbonyl band at 1740 cm$^{-1}$. GC showed no presence of 1,2,2,6,6-pentamethyl-4-piperidinol
[3] Viscous oil, IR spectrum showed no presence of starting bischloroformate.
[4] Resinous material, IR spectrum showed the presence of a carbonate carbonyl band at 1738 cm$^{-1}$ and the absence of a chloroformate band at 1775 cm$^{-1}$.

Based on the method of preparation and analyses, I-24 was a bis(1,2,2,6,6-pentamethyl-4-piperidinoxycarbonyloxy) endcapped Carbowax ® 1000 oligomer.

Based on the method of preparation and analyses, I-25 was a mono(1,2,2,6,6-pentamethyl-4-piperidinoxycarbonyloxy) endcapped Carbowax ® 2000 oligomer.

Based on the method of preparation and analyses, I-26 was a bis(1,2,2,6,6-pentamethyl-4-piperidinoxycarbonyloxy) endcapped Niax° 1025 oligomer.

Based on the method of preparation and analyses, I-27 was a bis(1,2,2,6,6-pentamethyl-4-piperidinoxycarbonyloxy)endcapped polybutadiene (PBD) oligomer.

EXAMPLE 25

Reaction of the Sodium Alkoxy Salt of 2,2,6,6-tetramethyl-4-piperidinol with Carbowax ® 1000 Bischloroformate (Compounds I-28a and I-28b)

Using the procedure outlined in Example 11, 3.5 g (22.0 mmoles) of 2,2,6,6-tetramethyl-4-piperidinol, 2.4 g (30.0 mmoles) of pyridine and 15 mL of methylene chloride were reacted with 11.2 g (20.0 mequivalents) of the bischloroformate of Carbowax ® 1000. After the work-up, two waxy solids were obtained. One (I-28a), 4.5 g (theory, 13.6 g), as the desired product, the bis(2,2,6,6-tetramethyl-4-piperidinoxycarbonyloxy) endcapped Carbowax ® 1000, and the second (I-28b), 6.3 g, was the carbonate-carbamate polymer resulting from reaction of Carbowax ® 1000 BCF with both the hydroxy group in the '4' position and the hindered amine group in the '1' position of 2,2,6,6-tetramethyl-4-piperidinol. The desired product had a carbonate carbonyl band at 1745 cm$^{31}$ [1].

EXAMPLE 26

Preparation of Sulfonic Acid Salt Oligomers Using Ethyl Acetate as the Solvent (Compounds I-1, I-29, I-30 and I-31)

General Procedure: A 1 L three-neck flask was charged with about 400 mL of dry ethyl acetate, 8.5 g (80 mmoles) of anhydrous sodium carbonate and sufficient oligomeric diols as indicated in the Table below for 50 m.e.q. of hydroxyl groups. The mixture was magnetically stirred and was purged with nitrogen for 2-3 minutes prior to addition of 12.2 g (60.9 mmoles) of 97% 2-sulfobenzoic acid cyclic anhydride in one portion. The resultant suspension was heated to reflux until the evolution of $CO_2$ had ceased (ca. 90 minutes). The reaction mixture was cooled to about 45° C. and was washed once with about 250 mL of 33% monosodium dihydrogen phosphate solution. The liquid phases were allowed to separate and, if necessary, additional ethyl acetate was added to aid the separation. The lower aqueous layer was separated and discarded and the solvent was removed from the product layer to yield the desired products. The products obtained from the reaction with the various oligomers are set forth in the following Table.

| Oligomer Used | Quantity, g | Product Yield | | Product |
|---|---|---|---|---|
| | | Theory, g | Actual, g | |
| TONE ® 260 | 75.0 | 85.3 | 90.2 | I-1 |
| TONE ® 240[1] | 50.0 | 60.4 | 58.5 | I-29 |
| TONE ® 210[2] | 20.8 | 31.5 | 27.7 | I-30 |
| Duracarb ® 122[3] | 21.2 | 32.0 | 28.0 | I-31 |

[1]An oligomeric polycaprolactone based diol, having a molecular weight of ca. 2000 based on a hydroxyl content of 1.72%, manufactured by Union Carbide Corporation
[2]An oligomeric polycaprolactone based diol, having a molecular weight of ca. 800 based on a hydroxyl content of 4.12%, manufactured by Union Carbide Corporation
[3]An aliphatic polycarbonate oligomeric diol, having a molecular weight of about 1000 based on a hydroxyl content of 3.52 weight %, manufactured by PPG Industries, Inc.

Example 27 relates to flame retardant testing of a polycarbonate blended with flame retardant oligomeric compounds of the present invention. The polycarbonate selected is believed to be representative of the flame retardant properties provided by the general category of flame retardant oligomers of the present invention not only with respect to the particular polycarbonate used in the test but also with respect to polycarbonates in general, as well as other engineering thermoplastic polymeric resins.

EXAMPLE 27

Flame Retardant Testing of Bisphenol A Polycarbonate (PC) containing Invention Flame Retardant Additives Dow Calibre ® 300-6 (referred to generally hereinafter as "300-6" general purpose bisphenol A polycarbonate (PC) (weight average molecular weight of about 55,000; intrisic viscosity of 0.507 dL/g at 25° C. in methylene chloride) was blended with various levels of oligomeric compounds of the present invention (I-1 from Example 1, I-2 from Example 2 and I-3 from Example 5), employing the following procedure:

Pellets of 300-6 PC were dried in an oven at 125° C. for 4 hours. The required amount (as indicated in Table 1 below) of I-1 was melted, poured onto the hot 300-6 pellets and the resulting composition was thoroughly hand-mixed while the composition cooled to some extent. While still cooling, the 300-6 PC-I-1 blend was extruded at 280° C. through a one and a quarter inch Brabender Extruder having a length to diameter ratio of 25 to 1. The extruded composition was then dried again in an oven at 125° C. for 4 hours just prior to molding into desired test specimens using either a Newberry or Stokes injection molding machine with an appropriate mold.

Notched Izod tests (ASTM D-256) at room temperature and at 30° F. Melt flow index tests (ASTM D-1238, condition "O") and UL-94 burning tests were carried out on appropriate specimens of 300-6 PC blended with 0.0% (control), 0.125%, 0.250%, 0.50%, 1.0% and 1.5% of I-1. The results of these tests are set forth in Example 27—Table 1.

Also tested were Dow Calibre ® 700-6 ignition resistant grade PC (hereinafter "700-6") and 300-6 PC compounded with 2.0% I-2 (from Example 2) and 2.0% I-3 (from Example 5) using the procedures set forth above. The results of this work are summarized in Example 27—Table 2.

TABLE 1

| Dow PC Additive Level, % | Example 27 300-6 | | | | | |
|---|---|---|---|---|---|---|
| I-1 | 0.0 | 0.125 | 0.250 | 0.50 | 1.0 | 1.5 |
| Notched Izod Rm Temp, Ft-lb/in | 17.7 | 17.6 | 17.3 | 17.4 | 17.5 | 17.1 |
| Notched Izod | 17.7 | 17.5 | 17.0 | 17.0 | 16.3 | 12.3 |

TABLE 1-continued

| | Example 27 | | | | | |
|---|---|---|---|---|---|---|
| Dow PC Additive Level, % | 300-6 | | | | | |
| 30° F., Ft-lb/in Melt Flow Index, grams/10 mins. | 5.3 | 5.6 | 6.0 | 6.6 | 7.4 | 8.4 |
| UL-94 Rating (⅛ inch specimens) | V-2 | V-0 | V-0 | V-0 | V-0 | V-0 |

TABLE 2

| | Example 27 | | |
|---|---|---|---|
| Dow PC Additive Level, % | 300-6 | 300-6 | 700-6 |
| I-2 | 2.0 | — | — |
| I-3 | — | 2.0 | — |
| None | — | — | 0.0 |
| Notched Izod Rm Temp, Ft-lb/in | 16.9 | — | — |
| Notched Izod 30° F., Ft-lb/in | — | — | — |
| Melt Flow Index, grams/10 mins. | 10.9 | 9.9 | — |
| UL-94 Rating (⅛ inch specimens) | V-0 | V-0 | V-0 |

These results show that the invention oligomers of the present invention, i.e., I-1, I-2 and I-3, convey highly desirable V-0 ratings (UL-94 tests) to a general purpose bisphenol PC (300-6) without detrimentally affecting physical properties such as notched izod or melt flow. In addition, very low levels are effective in conveying V-0 ratings to 300-6 PC, e.g., 0.125% I-1. These results are in contrast to the teachings of the prior art. Briefly, a classification of the UL-94 test results is as follows:

UL-94 V-2: No test specimen may burn for more than 30 seconds, and the total burn time for five test specimens may not exceed 250 seconds. The test specimens may have drips that burn.

UL-94 V-1: No test specimen may burn for more than 30 seconds, and the total burn time for five test specimens may not exceed 250 seconds. The test specimens may not have drips that burn.

UL-94 V-0: No test specimen may burn for more than 10 seconds, and the total burn time for five test specimens may not exceed 50 seconds. The test specimens may not have drips that burn.

Thus, the prior art on flame retarding PC's indicates that both a sulfonic acid salt as well as a bromine compound are necessary for effective flame retardance of PC's. In fact, Dow Chemical Co.'s ignition resistant grade PC (i.e., 700-6) contains both a salt and a bromine compound. The inventors have surprisingly found that a very low level of I-1, a novel flame retardant oligomer of this invention, is effective without a bromine compound in flame retarding PC.

The following Examples 28 through 32 illustrate the preparation of various sulfobenzoic acid compounds and derivatives generally corresponding to the compound of Structure C set forth above. The same general preparative techniques typically would be used to prepare other compounds and derivatives under the broad definition of Structure C. Variations would be well known to those of ordinary skill in the art.

EXAMPLE 28

Preparation of 2-Sulfobenzoic Acid Monosodium Salt (Compound (I-32)

20 g (108.6 mmoles) of 2-sulfobenzoic acid cyclic anhydride were added to a beaker containing 250 mL of water. After the reactant dissolved, 4.4 g (110 mmoles) of sodium hydroxide were added. After the water was removed, 22.9 g (94% of theory) of a white powder product, I-32, the title compound, were recovered.

EXAMPLE 29

Preparation of 2-Sulfobenzoic Acid Methyl Ester, Sodium Salt (Compound I-33)

A flask containing 150 mL of methanol was charged with 20.3 g (110 mmoles) of 2-sulfobenzoic acid cyclic anhydride. The anhydride quickly dissolved with evolution of heat. Then, 4.4 g (110 mmoles) of sodium hydroxide were added. After the sodium hydroxide dissolved, the excess methanol was removed to yield 23 g (100% of theory) of a white powder product, I-33, the title compound.

EXAMPLE 30

Preparation of 2-Sulfobenzoic Acid Octyl Ester, Sodium Salt (Compound I-34)

20.2 g (109.2 mmoles) of 2-sulfobenzoic acid cyclic anhydride were added to a flask containing 75 g (576 mmoles) of 1-octanol. The magnetically stirred mixture was warmed to 30° C. for 30 minutes to yield a slightly hazy solution. Then, 4.6 g (115 mmoles) of sodium hydroxide, dissolved in 20 mL of water, were added to the 1-octanol solution. A clear solution resulted. Then as much of the excess 1-octanol as possible was removed under reduced pressure. The resulting white paste was slurried in 300 mL of hexane and filtered. The resulting white solid was dried to a constant weight in a 40° C. vacuum oven to yield 33.6 g (96.8% of theory) of dry product, I-34, the title compound.

EXAMPLE 31

Preparation of 2-Sulfobenzoic Acid 4-Phenyl-Phenyl Ester, Sodium Salt (Compound I-35)

20.6 g (112 mmoles) of 2-sulfobenzoic acid cyclic anhydride and 18.5 g (109 mmoles) o 4-phenyl-phenol were added to a flask containing 300 mL of toluene. The stirred mixture was warmed to 60° C. for 30 minutes. A somewhat hazy solution resulted which was filtered hot through a coarse fritted glass filter to yield a clear solution. Upon cooling, a precipitate formed, which was redissolved after warming to 60° C. When 4.6 g (115 mmoles) of sodium hydroxide in 25 mL of water were added to the warm solution, a heavy precipitate immediately formed. After 30 minutes of additional stirring, the solid was filtered while hot and was washed with toluene. The product was then dried to a constant weight in a 70° C. vacuum oven to yield 31.5 g (79% of theory) of a white powder product, I-35, the title compound.

EXAMPLE 32

Preparation of 2-Sulfobenzoic Acid 2,2,3,4,4,4-Hexafluoro-1-butyl Ester, Sodium Salt (Compound I-36)

15.0 g (82.4 mmoles) of 2,2,3,4,4,4-hexafluorobutan-1-ol and 10.0 g (54 mmoles) of 2-sulfobenzoic acid cyclic anhydride were added to 50 mL of dry methylene chloride. The mixture was heated to reflux for several hours. The resulting clear solution was cooled to room temperature and was neutralized with 2.2 g (55 mmoles) of sodium hydroxide in 20 mL of water. The solvent was removed and the resultant solid was dried to constant weight in a 60° C. vacuum oven. 17.5 g (83.5% of theory) of a white powder product, I-36, the title compound, were obtained.

The following Example 33 relates to flame retardant testing of a polycarbonate which has been blended with various oligomeric sulfonic acid salt derivatives and various monomeric sulfonic acid salt derivatives according to the present invention. The test procedures and compounds tested are believed to be typical of the procedures used and results which would be obtained if other compounds according to the present invention were tested as would be well known by one of ordinary skill in the art.

EXAMPLE 33

Flame Retardant Testing of Bisphenol A Polycarbonate (PC) containing Invention Flame Retardant Additives The oligomeric salts of Example 26 (I-1, I-29, I-30 and I-31) were compounded into Dow's 300-6 general purpose PC according to the procedure described in Example 27 using the amounts set forth in Example 33—Table 1 below. The salts of the monomeric sulfobenzoic acid compounds from Examples 29 through 32 were added as dry powders in an amount of 0.2%, based n the weight of the PC, to dry PC which had been previously coated with 0.1 weight % mineral oil. The coated pellets were then extruded and molded as described in Example 27. UL-94 and Oxygen Index (ASTM Procedure D 2863) tests were then carried out on the molded specimens. The results are summarized in Example 33, Tables 1 and 2.

TABLE 1

Example 33
UL-94 and Oxygen Index Test Results for Oligomeric Sulfonic Acid Salt Derivatives in Bisphenol A PC

| Additive | Level, % | UL-94 Rating | Oxygen Index |
|---|---|---|---|
| None | — | V-2 | 26 |
| I-1 | 0.2 | V-1 | 32 |
| I-29 | 0.2 | V-0 | 35 |
| I-30 | 0.2 | V-0 | 37 |
| I-31 | 0.2 | V-0 | 36 |
| I-1* | 0.2 | V-0 | 36 |
| I-29* | 0.2 | V-0 | 37 |
| I-30* | 0.2 | V-0 | 40 |
| I-1 | 0.1 | V-1 | 30 |
| I-29 | 0.1 | V-0 | 34 |
| I-30 | 0.1 | V-0 | 33 |
| I-1 | 0.05 | V-2 | 28 |
| I-29 | 0.05 | V-0 | 31 |
| I-30 | 0.05 | V-0 | 32 |

*In combination with 0.6% Decabromodiphenyl Ether

TABLE 2

Example 33
UL-94 and Oxygen Index Test Results for Monomeric Sulfonic Acid Salt Derivatives in Bisphenol A PC

| Additive | Level, % | UL-94 Rating | Oxygen Index |
|---|---|---|---|
| None | — | V-2 | 26 |
| I-32 | 0.2 | V-0 | 33 |
| I-33 | 0.2 | V-0 | 34 |
| I-34 | 0.2 | V-0 | 34 |
| I-35 | 0.2 | V-0 | 36 |

TABLE 2-continued

Example 33
UL-94 and Oxygen Index Test Results for Monomeric Sulfonic Acid Salt Derivatives in Bisphenol A PC

| Additive | Level, % | UL-94 Rating | Oxygen Index |
|---|---|---|---|
| I-36 | 0.2 | V-0 | 35 |

Briefly, a classification of the UL-94 test results is as follows:

UL-94 V-2: No test specimen may burn for more than 30 seconds, and the total burn time for five test specimens may not exceed 250 seconds. The test specimens may have drips that burn.

UL-94 V-1: No test specimen may burn for more than 30 seconds, and the total burn time for five test specimens may not exceed 250 seconds. The test specimens may not have drips that burn.

UL-94 V-0: No test specimen may burn for more than 10 seconds, and the total burn time for five test specimens may not exceed 50 seconds. The test specimens may not have drips that burn.

The Oxygen Index Number is the volume percent of oxygen in an oxygen-nitrogen mixture that is necessary to maintain burning of the test specimen. The volume percent oxygen in a normal atmosphere is 21. Thus, the higher the Oxygen Index Number, the more flame retardant a composition is.

Clearly, the test results demonstrate that the sulfonic acid salt derivatives of this invention have significantly improved the ignition resistance of the polycarbonate with which they have been blended.

The present invention may be embodied in other specific forms without departing from the spirit or essential attributes thereof and, accordingly, reference should be made to the appended claims, rather than to the foregoing specification as indicating the scope of the invention.

We claim:

1. An oligomeric performance additive compound having at least one functional performance group, the compound having a structure A:

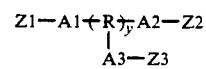

$y = 0$ to 75,

Z1, Z2 and Z3 are the same or different with the proviso that at least one of Z1, Z2 and Z3 is selected from the group consisting of at least one of performance additive functional group I, II and III, wherein performance additive functional group I is an antioxidant monoradical having a structure selected from the group consisting of structure (1), (2) and (3);

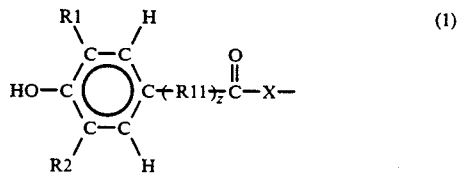

where
X is selected from the group consisting of NH and O,

R1 and R2 are the same or different and each is selected from the group consisting of an alkyl radical of 1 to 13 carbons and a t-aralkyl radical of 9 to 13 carbons, R11 is a alkylene diradical of 1 to 6 carbons, and z is 0 or 1;

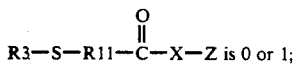 (2)

R3—S—R11—C(=O)—X—Z is 0 or 1;

where R3 is selected from the group consisting of an alkyl radical of 1 to 18 carbons, an aryl radical of 6 to 12 carbons and an aralkyl radical of 7 to 11 carbons; and

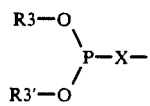 (3)

where

R3 and R3' are the same or different, and R3' is selected from the group consisting of an alkyl radical of 1 to 18 carbons, an aryl radical of 6 to 12 carbons and an aralkyl radical of 7 to 11 carbons;

performance additive functional group II is a UV stabilizing monoradical having a structure selected from the group consisting of structure (1), (2), (3) and (4):

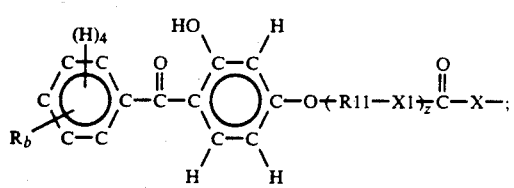 (1)

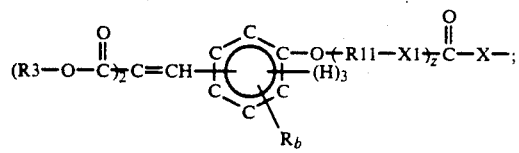 (2)

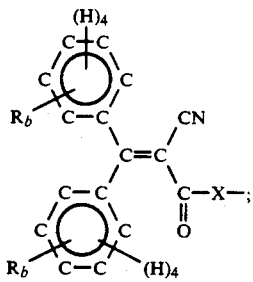 (3)

where

X1 is selected from the group consisting of nothing and O, and $R_b$ is selected from the group consisting of hydrogen and a substituent selected from the group consisting of a lower alkyl radical, a lower alkoxy radical, a cyano radical, chloro, bromo and nitro;

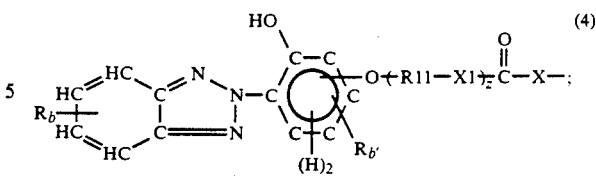 (4)

where $R_{b'}$ is selected from the group consisting of hydrogen and a substituent selected from the group consisting of a lower alkyl radical, a t-octyl radical, an alpha-cumyl radical, a lower alkoxy radical, a cyano radical, chloro, bromo and nitro; and performance additive functional group III is a light stabilizing monoradical having a structure:

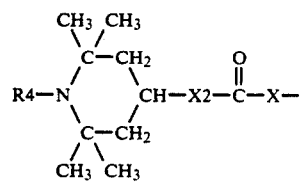

where

X and X2 are the same or different and each is selected from the group consisting of NH and O, and R4 is selected from the group consisting of H, a lower alkyl radical, an acyl radical of 2 to 18 carbons, an aroyl radical of 7 to 15 carbons, an alkoxycarbonyl radical of 2 to 19 carbons, and an aryloxycarbonyl radical of 7 to 15 carbons;

any other of Z1, Z2 and Z3 not selected from the group consisting of performance additive functional groups I, II and III is selected from the group consisting of hydroxy, amino, at least one substituted radical and an unsubstituted radical, where the radical is selected from the group consisting of an alkoxy radical of 1 to 12 carbons, an alkylamino radical of 1 to 12 carbons, an acyloxy radical of 1 to 12 carbons, an acylamino radical of 1 to 12 carbons, an alkenoyloxy radical of 3 to 12 carbons, an alkenoylamino radical of 3 to 12 carbons, an aroyloxy radical of 7 to 15 carbons, an aroylamino radical of 7 to 15 carbons, a phthalimido radical, an alkoxycarbonyloxy radical of 2 to 13 carbons, an alkoxycarbonylamino radical of 2 to 13 carbons, an alkenyloxycarbonyloxy radical of 3 to 12 carbons, an alkenyloxycarbonylamino radical of 3 to 12 carbons, an aryloxycarbonyloxy radical of 7 to 15 carbons, an aryloxycarbonylamino radical of 7 to 15 carbons, an alkylaminocarbonyloxy radical of 2 to 13 carbons, an arylaminocarbonyloxy radical of 7 to 15 carbons, an aralkylaminocarbonyloxy radical of 7 to 16 carbons, an alkylsulfonyloxy radical of 1 to 8 carbons, an alkylsulfonylamino radical of 1 to 8 carbons, an arylsulfonyloxy radical of 6 to 11 carbons, an arylsulfonylamino radical of 6 to 11 carbons, a perfluoroacyloxy radical of 2 to 14 carbons, and a perfluoroacylamino radical of 2 to 14 carbons; where the substituents thereof are selected from the group consisting of Cl, Br, an acetyl radical, an alkyl radical of 1 to 6 carbons, an alkenyl radical of 2 to 6 carbons, an aryl radical of 6 to 10 carbons, an alkoxy radical of 1 to 6 carbons, an aryloxy radical of 6 to 10 carbons, an alkoxycarbonyl radical of 2 to 13 carbons, a hydroxyalkoxycarbonyl radical of 3 to 13 carbons, a chlorohydroxyalkoxycarbonyl radical of 4 to 13 carbons, and an epoxyalkoxycarbonyl radical of 4 to 13 carbons;

A1, A2 and A3 are nothing, the same or different, with the proviso that when A3 is nothing, only one of A1 and A2 can be nothing, and when y=0,
A2 is nothing, and
A1 is selected from the group consisting of diradicals (1), (2) and (3):

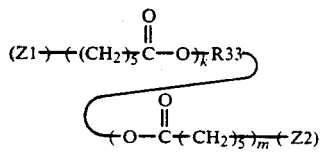
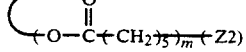
(1)

where
R33 is selected from the group consisting of an alkylene diradical of 2 to 8 carbons and an alkylene diradical of 2 to 8 carbons containing at least one atom selected from the group consisting of O, S and N atoms in the alkylene chain,
(Z1) and (Z2) show the relationship of the —A1—diradical to Z1 and Z2, respectively, and the sum of k and m is 3 to 50;

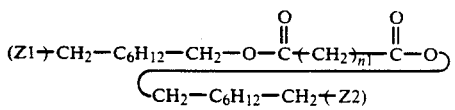
(2)

where
(Z1) and (Z2) show the relationship of the —A1—diradical to Z1 and Z2, respectively, and n1 is 5 to 20; and
(3) an oligomeric diradical selected from the group consisting of an oligomeric polybutadiene diradical, an oligomeric aromatic polyester diradical, an oligomeric aliphatic polyurethane diradical and an oligomeric aliphatic polyurea diradical; and
when at least one of Z1 and Z2 are selected from performance additive group III and when two of Z1 and Z2 are each selected from different performance additive functional groups I, II and III, A1 can additionally be selected from (4):

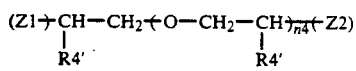
(4)

wherein
R4' is selected from the group consisting of H and a lower alkyl radical,
(Z1) and (Z2) show the relationship of the —A1—diradical to Z1 and Z2, respectively, and n4 is 2 to 70; and
when y is 1,
the triradical

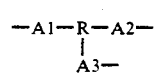

has a structure

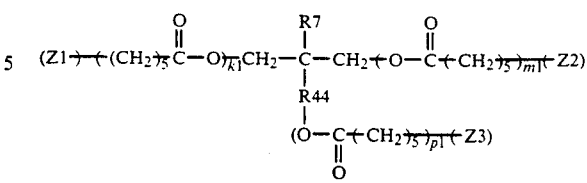

where
(Z1), (Z2) and (Z3) show the relationship of the triradical to Z1, Z2 and Z3, respectively,
R7 is selected from the group consisting of H and an alkyl radical of 1 to 6 carbons,
R44 is selected from the group consisting of nothing and an alkylene diradical of 1 to 6 carbons, and
the sum of k1, m1 and p1 is 2 to 20;
when y is 2 to 75,
A1 has a structure:

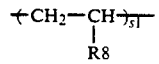

where
R8 is selected from the group consisting of a phenyl radical and an acetoxy radical and
s1 is 4 to 25; and
when y is 2 to 74,
A2 and A3 are nothing, and
triradical R has a structure:

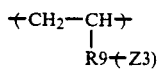

where
R9 is selected from the group consisting of nothing and a methylene diradical, (Z3) shows the relationship between the triradical R group and Z3;
the compound of Structure A being preparable from a compound of Structure B:

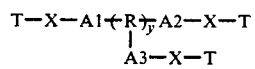
B where
T is selected from the group consisting of H and a halocarbonyl radical;
where the compound of Structure B is reacted with a performance additive compound possessing at least one co-reactive group selected from the group consisting of a hydroxy radical, an amino radical, an epoxide radical, a carboxylic acid cyclic anhydride radical, a sulfocarboxylic cyclic acid anhydride radical, a haloformate radical and an isocyanate radical.

2. A process for enhancing UV stability, light stability and/or oxidative stability of an engineering thermoplastic polymeric resin composition comprising mixing with the engineering thermoplastic polymeric resin composition about 0.05% to about 10% by weight, based on the weight of the engineering thermoplastic polymeric resin composition, of an oligomeric performance additive compound of Structure A according to claim 1, at about 100° C. to about 550° C., until intimately mixed.

3. A process according to claim 2 wherein the mixing is at a temperature of about 150° C. to about 400° C.

4. A process according to claim 2 wherein the engineering thermoplastic polymeric resin composition is selected from the group consisting of aromatic polycarbonates; aromatic polycarbonates blended with styrene maleic anhydride copolymers; aromatic polycarbonates blended with acrylonitrile butadiene styrene copolymers; polyethylene terephthalate; polybutylene terephthalate; polyphenylene oxide; polyphenylene oxide blended with polystyrene; polyphenylene oxide blended with high impact polystyrene; styrene maleic anhydride copolymers; acrylonitrile butadiene styrene copolymers; blends of polyethylene terephthalate and polybutylene terephthalate; nylons and polysulfones.

5. A composition comprising about 90% to about 99.95% of an engineering thermoplastic polymeric resin composition and about 0.05% to about 10% by weight, based on the weight of the engineering thermoplastic polymeric resin composition, of an oligomeric performance additive compound of Structure A according to claim 1.

6. A composition according to claim 5 wherein the engineering thermoplastic polymeric resin composition is selected from the group consisting of aromatic polycarbonates; aromatic polycarbonates blended with styrene maleic anhydride copolymers; aromatic polycarbonates blended with acrylonitrile butadiene styrene copolymers; polyethylene terephthalate; polybutylene terephthalate; polyphenylene oxide; polyphenylene oxide blended with polystyrene; polyphenylene oxide blended with high impact polystyrene; styrene maleic anhydride copolymers; acrylonitrile butadiene styrene copolymers; blends of polyethylene terephthalate and polybutylene terephthalate; nylons and polysulfones.

7. A compound according to claim 1 wherein at least one of Z1, Z2 and Z3 is an antioxidant monoradical having the structure:

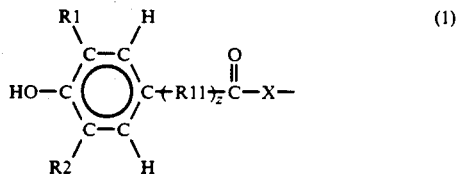

where
R1 and R2 are the same or different and are selected from the group consisting of a t-alkyl radical of 4 to 8 carbons and a t-aralkyl radical of 9 to 13 carbons; and
R11 is selected from the group consisting of an alkylene diradical of 1 to 3 carbons;
z is 1.

8. An oligomeric performance additive compound having at least one functional performance group, the compound having a structure A:

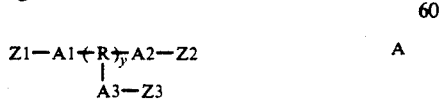

where
y=0 to 75,
Z1, Z2 and Z3 are the same or different with the proviso that at least one of Z1, Z2 and Z3 is an antioxidant monoradical performance additive functional group having a structure selected from the group consisting of structure (1), (2) and (3):

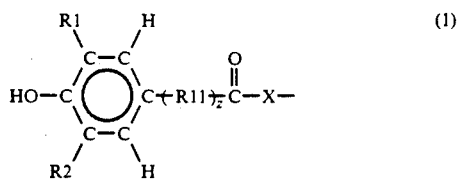

where
X is selected from the group consisting of NH and O,
R1 and R2 are the same or different and each is selected from the group consisting of an alkyl radical of 1 to 13 carbons and a t-aralkyl radical of 9 to 13 carbons,
R11 is selected from the group consisting of nothing and an alkylene diradical of 1 to 6 carbons, and
z is 0 or 1;

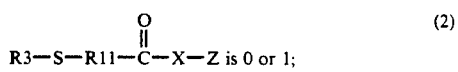

where r3 is selected from the group consisting of an alkyl radical of 1 to 18 carbons, an aral radical of 6 to 12 carbons and an aralkyl radical of 7 to 11 carbons; and

where
R3 and R3' are the same or different, and r3' is selected from the group consisting of an alkyl radical of 1 to 18 carbons, an aryl radical of 6 t 12 carbons and an aralkyl radical of 7 to 11 carbons;
any other of Z1, Z2 and Z3 not selected from the group consisting of antioxidant monoradicals (1), (2) and (3) is selected from the group consisting of hydroxy, amino, at least one substituted radical and an unsubstituted radical, where the radical is selected from the group consisting of an alkoxy radical of 1 to 12 carbons, an alkylamino radical of 1 to 12 carbons, an acyloxy radical of 1 to 12 carbons, an alkenoyloxy radical of 3 to 12 carbons, an alkenoylamino radical of 3 to 12 carbons, an aroyloxy radical of 7 to 15 carbons, an aroylamino radical of 7 to 15 carbons, a phthalimido radical, an alkoxycarbonyloxy radical of 2 to 13 carbons, an alkoxycarbonylamino radical of 2 to 13 carbons, an alkenyloxycarbonyloxy radical of 3 to 12 carbons, an alkenyloxycarbonylamino radical of 3 to 12 carbons, an aryloxycarbonyloxy radical of 7 to 15 carbons, an aryloxycarbonylamino radical of 7 to 15 carbons, an alkylaminocarbonyloxy radical of 2 to 13 carbons, an arylaminocarbonyloxy radical of 7 to 15 carbons, an aralkylaminocarbonyloxy radical of 7 to 16 carbons, an alkylsulfonyloxy radical of 1 to 8 carbons, an alkylsulfonylamino radical of 1 to 8 carbons, an arylsulfonyloxy radical of 6 to 11 carbons, an arylsulfonylamino radical of 6 to 11 carbons, a perfluoroacyloxy radical of 2 to 14 carbons, and a perfluoroacylamino radical of 2 to 14 carbons; where the substituents thereof are selected from the group consisting of Cl, Br, an acetyl radical, an alkyl radical of 1 to 6 carbons, an alkenyl radical of 2 to 6 carbons, an aryl radical of 6 to 10 carbons, an alkoxy radical of 1 to 6 carbons, an aryloxy radical of 6 to 10 carbons, an alkoxycarbonyl radical of 2 to 13 carbons, a hydroxyalkoxycarbonyl radical of 3 to 13 carbons, a chlorohydroxyalkoxycarbonyl radical of 4 to 13 carbons, and an epoxyalkoxycarbonyl radical of 4 to 13 carbons;

A1, A2 and a3 are nothing, the same or different, with the proviso that when A3 is nothing, only one of A1 and A2 can be nothing, and when y=1, A2 is nothing, and A1 is selected from the group consisting of diradicals (1), (2) and (3);

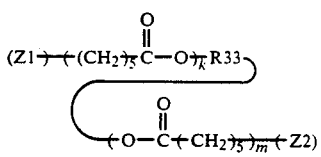
(1)

where

R33 is selected from the group consisting of an alkylene diradical of 2 to 8 carbons and an alkylene diradical of 2 to 8 carbons containing at least one atom selected from the group consisting of O, S and N atoms in the alkylene chain, (Z1) and (Z2) show the relationship of the —A—diradical to Z1 and Z2, respectively, and the sum of k and m is 3 to 50;

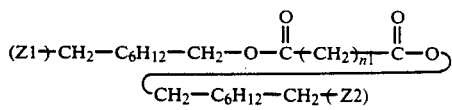
(2)

where (Z1) and (Z2) show the relationship of the —A1—diradical to Z1 and Z2, respectively, and n1 is 5 to 20; and (3) an oligomeric diradical selected from the group consisting of an oligomeric polybutadiene diradical, an oligomeric aromatic polyester diradical, an oligomeric aliphatic polyurethane diradical, an oligomeric aliphatic polyurea diradical; and when y is 1, the triradical

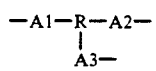

has a structure:

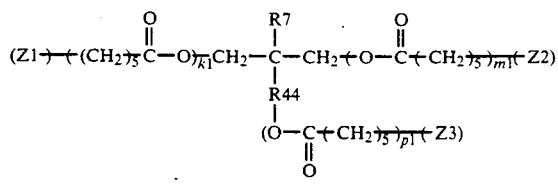

where (Z1), (Z2) and (Z3) show the relationship of the triradical to Z1, Z2 and Z3, respectively, R7 is selected from the group consisting of H and an alkyl radical of 1 to 6 carbons, R4 is selected from the group consisting of nothing and an alkylene diradical of 1 to 6 carbons, and the sum of k1, m1 and p1 is 2 to 20;

when y is 2 to 75,

A1 has a structure:

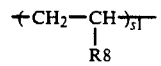

where

R8 is selected from the group consisting of a phenyl radical and an acetoxy radical and s1 is 4 to 25; and when y is 2 to 75, A2 and A3 are nothing, and triradical R has a structure:

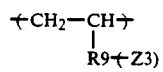

where

R9 is selected from the group consisting of nothing and a methylene diradical, (Z3) shows the relationship between the triradical R group and Z3;

the compound of Structure A being preparable from a compound of Structure B:

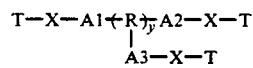
B where

T is selected from the group consisting of H and a halocarbonyl radical;

where the compound of Structure B is reacted with a performance additive compound possessing at least one co-reactive group selected from the group consisting of a hydroxy radical, an amino radical, an epoxide radical, a carboxylic acid cyclic anhydride radical, a sulfocarboxylic cyclic acid anhydride radical, a haloformate radical and an isocyanate radical.

* * * * *